United States Patent
Yamazaki

(10) Patent No.: US 9,921,402 B2
(45) Date of Patent: *Mar. 20, 2018

(54) OPTICAL FILTER, METHOD OF MANUFACTURING OPTICAL FILTER, AND OPTICAL INSTRUMENT

(75) Inventor: Seiji Yamazaki, Fujumi (JP)

(73) Assignee: Seiko Epson Corporation (JP)

( * ) Notice: Subject to any disclaimer, the term of this patent is extended or adjusted under 35 U.S.C. 154(b) by 937 days.

This patent is subject to a terminal disclaimer.

(21) Appl. No.: 13/210,611

(22) Filed: Aug. 16, 2011

(65) Prior Publication Data

US 2012/0045618 A1 Feb. 23, 2012

(30) Foreign Application Priority Data

Aug. 19, 2010 (JP) ................................ 2010-184225

(51) Int. Cl.
| | |
|---|---|
| *B32B 3/00* | (2006.01) |
| *B32B 37/02* | (2006.01) |
| *B32B 37/10* | (2006.01) |
| *B32B 37/12* | (2006.01) |
| *B32B 37/14* | (2006.01) |
| *B32B 9/04* | (2006.01) |

(Continued)

(52) U.S. Cl.
CPC .............. *G02B 26/001* (2013.01); *G01J 3/26* (2013.01); *Y10T 428/24479* (2015.01); *Y10T 428/31504* (2015.04)

(58) Field of Classification Search
CPC .... G02B 26/001; G02B 6/4215; G02B 5/284; G01J 3/26; Y10T 428/24479; B32B 7/12; B32B 7/14

USPC .............. 428/156, 172, 411.1; 359/578, 589; 356/519, 454

See application file for complete search history.

(56) References Cited

U.S. PATENT DOCUMENTS

| | | | |
|---|---|---|---|
| 5,142,414 A | 8/1992 | Koehler | |
| 5,689,106 A * | 11/1997 | Dahlin | .................. H01L 25/043 250/226 |
| 6,665,076 B1 | 12/2003 | Watterson et al. | |

(Continued)

FOREIGN PATENT DOCUMENTS

| | | |
|---|---|---|
| CN | 1576945 A | 2/2005 |
| JP | 2006-267524 A | 10/2006 |

(Continued)

OTHER PUBLICATIONS http://www.oxforddictionaries.com/us/definition/american_english/unitary. accessed Mar. 3, 2015.*

*Primary Examiner* — Nancy R Johnson
(74) *Attorney, Agent, or Firm* — Harness, Dickey & Pierce, P.L.C.

(57) ABSTRACT

An optical filter includes a first substrate which has a support portion, a second substrate which is supported by the support portion, a first optical film which is provided on the first substrate, and a second optical film which is provided on the second substrate to face the first optical film. The first substrate and the second substrate are fixed to each other by bonding a first bonding film which is provided on the entire region of a support surface of the support portion supporting the second substrate and a second bonding film which is provided on at least a region (opposing surface) facing the entire region of the support surface from a supported surface of the second substrate.

23 Claims, 13 Drawing Sheets

(51) Int. Cl.
　　　*G02B 26/00*　　　(2006.01)
　　　*G01J 3/26*　　　(2006.01)

(56) References Cited

U.S. PATENT DOCUMENTS

| | | |
|---|---|---|
| 6,833,957 B2 | 12/2004 | Sato |
| 2004/0109250 A1 | 6/2004 | Choi et al. |
| 2005/0007933 A1 | 1/2005 | Yoda |
| 2005/0094699 A1* | 5/2005 | Lunt et al. .................. 372/92 |
| 2005/0111008 A1 | 5/2005 | Murata |
| 2006/0008200 A1 | 1/2006 | Nakamura et al. |
| 2006/0054795 A1 | 3/2006 | Cole et al. |
| 2006/0083478 A1* | 4/2006 | Emmons et al. ............ 385/147 |
| 2007/0171530 A1 | 7/2007 | Nakamura |
| 2007/0279730 A1 | 12/2007 | Heald |
| 2008/0278788 A1 | 11/2008 | Sasagawa |
| 2010/0142067 A1* | 6/2010 | Hanamura et al. .......... 359/850 |

FOREIGN PATENT DOCUMENTS

| | | |
|---|---|---|
| JP | 2008-076749 A | 4/2008 |
| JP | 2009-134025 | 6/2009 |
| JP | 2009-134026 | 6/2009 |
| JP | 2009-134027 | 6/2009 |
| JP | 2009-134028 | 6/2009 |
| JP | 2009-139601 A | 6/2009 |

* cited by examiner

A : POSITION OF END PORTION OF SUPPORT PORTION ON FIRST OPTICAL FILM
B : START POSITION OF MOVABLE UNIT (OR DIAPHRAGM UNIT)
C : POSITION OF END PORTION OF SUPPORT PORTION ON OPPOSITE SIDE TO FIRST OPTICAL FILM
D : POSITION OF END PORTION OF FIRST BONDING FILM ON OPPOSITE SIDE TO SECOND OPTICAL FILM

OPTICAL FILTER, METHOD OF MANUFACTURING OPTICAL FILTER, AND OPTICAL INSTRUMENT

BACKGROUND

1. Technical Field

The present invention relates to an optical filter, a method of manufacturing an optical filter, an optical instrument, and the like.

2. Related Art

JP-A-2009-134028 describes an optical filter which is constituted by a Fabry-Perot Etalon filter (hereinafter, referred to as an Etalon filter or simply referred to as an Etalon) having a pair of optical films arranged to face each other at a predetermined gap.

The Etalon filter described in JP-A-2009-134028 has a first substrate and a second substrate which are arranged in parallel with each other, a first optical film (first reflecting film) which is formed on the first substrate, and a second optical film (second reflecting film) which is formed on the first substrate to face the first optical film at a predetermined gap. Each of the first optical film and the second optical film forms a mirror, such that only light in a predetermined wavelength band based on the length (gap amount) of the gap can be transmitted through multiple interference of light between mirrors. By variably controlling the gap amount, it is possible to switch the wavelength band of light to be transmitted.

In the Etalon filter described in JP-A-2009-134028, in bonding the first substrate and the second substrate to each other, bonding films containing siloxane (Si—O) bonds is used. The precision of wavelength separation in the Etalon filter is deeply involved in the precision of the gap amount. Accordingly, in order to improve the performance of the Etalon filter, it is necessary to control the length of the gap between the first optical film and the second optical film with high precision.

In order to realize the improvement in wavelength resolution while promoting reduction in the size of the Etalon filter, there is a need for a technique which controls the gap between the first optical film and the second optical film, for example, in a nanometer order with high precision. Accordingly, when the first substrate and the second substrate are bonded to each other through bonding films containing siloxane bonds, it is important to secure the parallelism between the substrates without inclining the substrates.

However, in order to bond the substrates to each other using bonding films, for example, it is necessary to activate the bonding films formed on the substrates by ultraviolet irradiation, oxygen plasma treatment, or the like, to carry out positioning (alignment) of the substrates, and to apply a weight to the substrates. During this process, slight inclination may occur on the substrates.

As the factor for the occurrence of inclination on the substrates, for example, there is misalignment (bonding film misalignment) when partially forming bonding films on the substrates or substrate misalignment in a process for bonding the substrates to each other. A slope or roundness is likely to be formed in the edge portion of the bonding film. This also becomes the factor for the inclination of the substrates.

SUMMARY

An advantage of some aspects of the invention is, for example, to provide an optical filter in which substrates are attached to each other, the inclination of the substrates is suppressed, and the parallelism between optical films on the substrates is secured.

(1) One aspect of the invention is directed to an optical filter including: a first substrate which has a support portion, a second substrate which is supported by the support portion, a first optical film which is provided on the first substrate, and a second optical film which is provided on the second substrate to face the first optical film. The first substrate and the second substrate are fixed to each other by bonding a first bonding film which is provided on the entire region of a support surface of the support portion supporting the second substrate and a second bonding film which is provided on at least a region (opposing surface) facing the entire region of the support surface from a supported surface of the second substrate.

With this configuration, the second substrate is supported by the support portion of the first substrate. The support portion may be formed by processing the first substrate itself.

The first bonding film is provided on the entire range (entire surface) of the support surface in the support portion. That is, the entire region (entire surface) of the support surface of the support portion is covered with the first bonding film, and the surface (the surface on the second substrate side) of the first bonding film on the support surface of the support portion 22 is a flat surface with no step, that is, an even surface. The second bonding film is provided on at least a region (opposing surface) facing the entire region of the support surface from the supported surface of the second substrate.

In regard to design, the supported surface of the second substrate is, for example, a surface which is planned to be supported by the support portion, and can be actually regarded as a flat surface including a surface supported by the support portion. The supported surface may include, for example, a positional shift margin region which is provided near the region actually supported by the support portion.

The second bonding film is provided on at least a region facing the entire region of the support surface from the supported surface. That is, a region overlapping the entire region (entire surface) of the support surface of the support portion from the supported surface of the second substrate is covered with the second bonding film in plan view when viewed from the thickness direction of the second substrate, and the surface (the surface on the first substrate side) of the second bonding film becomes a flat surface with no step, that is, an even surface.

That is, with this configuration, the first bonding film and the second bonding film are bonded to each other in a state where the flat surface of the first bonding film provided on the entire surface of the support surface comes into contact with the flat surface of the second bonding film facing the flat surface of the first bonding film, such that the fixing of the first substrate and the second substrate are fixed to each other, that is, the attachment of the first substrate and the second substrate is realized. With this configuration, the second substrate is supported using the entire surface of the support surface, and the second substrate is stably supported on the support surface by bringing the flat surfaces of the bonding films into contact with each other, thereby suppressing the inclination of the second substrate with respect to the first substrate.

It is necessary that the gap between the first optical film provided on the first substrate and the second optical film provided on the second substrate is set, for example, in a nanometer order with high precision. In order to realize high-precision gap control, it is important to secure the parallelism between the surfaces (opposing surfaces) of the optical films facing each other. With this configuration, for example, it is possible to attach the substrates held horizontally to each other while maintaining that parallelism, thereby realizing a minute gap between the first optical film and the second optical film with high precision.

(2) In another aspect of the optical filter according to the invention, the support portion provided in the first substrate may have a protrusion which protrudes in the thickness direction of the first substrate at a predetermined distance based on a bottom surface of a concave portion provided in the first substrate, the protrusion may be provided around the first optical film in plan view when viewed from the thickness direction of the first substrate, and a first edge portion and a first lateral surface of the protrusion forming the support portion on the first optical film side in the support portion and a second lateral surface and a second edge portion on an opposite side to the first optical film may be covered with the first bonding film.

As described above, the first bonding film provided on the entire region (entire surface) of the support surface in the support portion has a flat surface. From a microscopic view, however, a slope or roundness of the first bonding film is likely to occur near the edge (corner) of the support portion. In this state, it is assumed that the second substrate is placed on the support portion, and a weight is applied to the first bonding film. In this case, a slope or the like of the first bonding film occurs near the edge (corner) of the support portion, the second substrate may be pulled outward (the opposite side to the first optical film) or inward (the first optical film side) of the support portion, such that a minute slope may occur in the second substrate.

Accordingly, with this configuration, a structure is used in which the edge portions (corner portion) and the lateral surfaces of the support portion as well as the entire region (entire surface) of the support surface are covered with the first bonding film. That is, the support portion has the protrusion (convex portion) which protrudes in the thickness direction of the first substrate at a predetermined distance based on the bottom surface of the concave portion provided in the first substrate. The protrusion has the first edge portion and the first lateral surface on the first optical film side, and the second edge portion and the second lateral surface on the opposite side to the first optical film. The first edge portion, the first lateral surface, the second edge portion, and the second lateral surface of the protrusion are all covered with the first bonding film.

According to this structure, the first bonding film is extended outward (the opposite side to the first optical film) or inward (the first optical film side) of the support portion by the amount corresponding to the film thickness. Even when a slope or roundness of the first bonding film occurs in the edge portion, the slope or roundness occurs in the extended portion, such that there is no influence on the evenness in the surface of the first bonding film on the support surface. Thus, the evenness of the surface of the first bonding film is maintained on the entire region (entire surface) of the support surface. That is, bonding is realized by bringing the flat surfaces of the bonding films into contact with each other even near the edge portions of the support portion. Therefore, it is possible to further reduce the possibility that the second substrate is inclined.

(3) In another aspect of the optical filter according to the invention, the second bonding film may be provided on the entire surface of a surface of the second substrate on the first substrate side.

With this configuration, the second bonding film is provided on the entire region (entire surface) of the surface of the second substrate on the first substrate side. The second bonding film is formed on the entire surface of the second substrate, such that the structure has resistance to a positional shift. For example, when bonding the first substrate and the second substrate to each other, even when the position of one substrate is shifted with respect to another substrate, the second bonding film is certainly present on the first bonding film, and the positional shift is not problematic. In a process for manufacturing a second substrate, it is not necessary to pattern the second bonding film, thereby reducing a load when manufacturing.

(4) In another aspect of the optical filter according to the invention, the first bonding film may be provided on the entire region of a surface of the first substrate on the second substrate side.

With this configuration, the first bonding film is formed on the entire surface of the first substrate on the second substrate side. Thus, the first bonding film can be formed on the support surface (upper surface) of the protrusion forming the support and the first edge portion, the second edge portion, the first lateral surface, and the second lateral surface in the protrusion. It is not necessary to pattern the first bonding film, thereby reducing a load in the process for manufacturing the first substrate.

(5) In another aspect of the optical filter according to the invention, the first bonding film may be provided in a region not overlapping the first optical film in plan view when viewed from the thickness direction of the first substrate, and the second bonding film may be provided in a region not overlapping the second optical film in plan view when viewed from the thickness direction of the second substrate.

It may be assumed that, when the first bonding film is present below the first optical film, the first optical film is slightly inclined due to the influence of a variation in the thickness of the first bonding film, or the like. The first bonding film below the first optical film may have an influence on the reflective characteristics of a mirror. The same is applied to a case where the second bonding film is present below the second optical film. Accordingly, with this configuration, no first bonding film is provided below the first optical film, and no second bonding film is provided below the second optical film. That is, each bonding film is provided in a region not overlapping each optical film in plan view when viewed from the thickness direction of the corresponding substrate. Therefore, there is no case where each bonding film has an influence on the evenness of each optical film or the reflective characteristics of the mirror.

(6) In another aspect of the optical filter according to the invention, the first bonding film may be provided on the first optical film, and the second bonding film may be provided on the second optical film.

With this configuration, the first bonding film is provided to cover the first optical film, and the second bonding film is provided to cover the second optical film. Each bonding film on each optical film has a function as a protective film (barrier film) which protects each optical film. For example, when bonding the bonding films to each other, an activation process may be performed by irradiation of ozone or ultraviolet rays, or the like. At this time, if each bonding film is present on each optical film, each bonding film protects each optical film from irradiation of ozone or ultraviolet rays. Therefore, deterioration in the characteristics of the optical films is suppressed.

(7) One aspect of the invention is directed to a method of manufacturing an optical filter. The optical filter includes a first substrate which has a support portion, a second substrate which is supported by the support portion, a first optical film which is provided on the first substrate, a second optical film which is provided on the second substrate to face the first optical film, a first bonding film which is provided on the entire region of a support surface of the support portion supporting the second substrate, and a second bonding film which is provided on at least a region facing the entire region of the support surface from a supported surface of the second substrate, the first substrate and the second substrate being fixed to each other by bonding the first bonding film and the second bonding film in the support portion. The method includes: forming, in a substrate, a concave portion, the support portion which has a protrusion in the thickness direction of the first substrate at a predetermined distance based on a bottom surface of the concave portion, and the first optical film to form the first substrate, forming, in a substrate, the second optical film to form the second substrate having the supported surface, when a maximum misalignment amount in a first direction of the second substrate which includes a pattern misalignment amount of the second bonding film in the first direction and a substrate misalignment amount in the first direction of the second substrate with respect to the first substrate is $\alpha$, and a maximum misalignment amount in the first direction of the first substrate is $\alpha$, setting a first positional shift margin equal to or greater than $2\alpha$ in a positive first direction in the supported surface of the second substrate, setting a second positional shift margin equal to or greater than $2\alpha$ in a negative first direction opposite to the positive first direction, and forming the second bonding film on a region of the supported surface facing the entire region of the support surface and a positional shift margin region defined by the first positional shift margin and the second positional shift margin, forming the first bonding film on the entire region of the support surface of the support provided in the first substrate, activating the first bonding film, activating the second bonding film, and maintaining the first substrate and the second substrate in a state where the first optical film and the second optical film face each other, and the support surface and the supported surface face each other, and applying a weight to at least one of the first substrate and the second substrate to bond the activated first bonding film and the activated second bonding film to each other, thereby fixing the first substrate and the second substrate to each other.

As described in the above-described aspect (1), it is preferable that the second substrate is supported using the entire surface of the support surface in the support portion, and the second substrate is stably supported on the support surface by bringing the flat surfaces of the bonding films into contact with each other. However, in actually manufacturing an optical filter, for example, there is a possibility that pattern misalignment in the first direction when forming the bonding films or misalignment between the substrates occurs. Even when misalignment occurs, in order to secure a stable substrate support structure described in the above-described aspect (1), it is effective to set a positional shift margin and then to attach the substrates to each other when manufacturing an optical filter.

Accordingly, with this configuration, when the direction parallel to the support surface and the supported surface is the first direction, the first positional shift margin equal to or greater than $2\alpha$ is set in the positive first direction in the supported surface of the second substrate, and the second positional shift margin equal to or greater than $2\alpha$ is set in the negative first direction. Then, the second bonding film is formed on the region of the supported surface facing the entire region of the support surface and the positional shift margin region defined by the first positional shift margin and the second positional shift margin.

Here, $\alpha$ is the maximum misalignment amount of the second substrate. For example, when the maximum pattern misalignment amount in the first direction to be predicted when partially growing the second bonding film on the second substrate is $\alpha 1$, and the maximum substrate misalignment amount in the first direction of the second substrate with respect to the first substrate to be predicted during a substrate attachment process is $\alpha 2$, the sum of $\alpha 1$ and $\alpha 2$ can be set as $\alpha$. That is, when both $\alpha 1$ and $\alpha 2$ are generated in the same direction (the positive first direction or the negative first direction), the misalignment amount in the first direction of the second substrate is maximized. Therefore, the maximum misalignment amount, that is, the sum of $\alpha 1$ and $\alpha 2$ can be set as $\alpha$.

With regard to the setting of the positional shift margin, it is necessary to take into consideration the maximum misalignment amount of the first substrate. When it is assumed that the first bonding film is formed on the entire region (entire surface) of the support surface in the support portion of the first substrate, with regard to the first substrate, it is not necessary to take into consideration pattern misalignment. For convenience of design, similarly to the second substrate, the maximum misalignment amount of the first substrate is $\alpha$.

When the maximum misalignment of the first substrate and the maximum misalignment of the second substrate occur in opposing directions, the positional shift between the bonding films formed on the substrates is maximized, and at this time, the amount of the maximum positional shift between the bonding films becomes $2\alpha$. There is a possibility that the maximum positional shift between the bonding films occurs in any one of the positive first direction and the negative first direction.

Taking into consideration this point, with this configuration, in the supported surface of the second substrate, the first positional shift margin equal to or greater than $2\alpha$ is set in the positive first direction, and the second positional shift margin equal to or greater than $2\alpha$ is set in the negative first direction. Therefore, even when the maximum positional shift occurs between the first bonding film and the second bonding film, it is possible to secure that the second bonding film is certainly present on the first bonding film.

The first bonding film is formed on the support surface of the support portion in the first substrate, such that, in a state where the bonding of the bonding films is completed, the first bonding film is present on the support surface of the support portion in the first substrate, and the second bonding film is certainly present on the first bonding film. That is, the structure "the second bonding film is formed on at least the region facing the entire region of the support surface from the supported surface of the second substrate, and the substrates are attached to each other by bringing the flat surfaces of the first bonding film and the second bonding film into contact with each other" described in the above-described aspect (1) is realized. As described above, according to this aspect, even when the maximum misalignment occurs, it becomes possible to stably support the second substrate on the support portion without being inclined.

(8) In another aspect of the method according to the invention, the second substrate may be a movable substrate which has a movable unit having a thin portion and a movable unit support portion supporting the movable unit and having a thickness greater than the thin portion, the surface of the movable unit support portion on the first substrate side may be the supported surface, and in the fixing of the first substrate and the second substrate, after a shortest distance in the first direction of the support portion in the first substrate from the position of an end portion on the first optical film side to a start position of the movable unit in the second substrate is set to be equal to or greater than $2\alpha$, the fixing of the first substrate and the second substrate may be performed.

With this configuration, the second substrate is a movable substrate, and the movable substrate has the movable unit which includes the thin portion (diaphragm unit), and the movable unit support portion which supports the movable unit and has a thickness greater than the thin portion. The shortest distance in the first direction of the support portion in the first substrate from the position of the end portion on the first optical film side to the start position of the movable unit in the second substrate is set to be equal to or greater than $2\alpha$.

If the maximum misalignment occurs, and the position of the end portion of the support portion on the first optical film side is inward of the start position of the movable unit of the second substrate, that is, on the first optical film side, a part of the thin portion (diaphragm) cannot be bent. As a result, the effective area of the movable unit is reduced less than the design value in plan view when viewed from the thickness direction of the second substrate, making it difficult to perform gap control between the optical films with desired precision.

With this configuration, the shortest distance in the first direction of the support portion in the first substrate from the position of the end portion on the first optical film side to the start position of the movable unit in the second substrate is set to be equal to or greater than $2\alpha$. Thus, even when the maximum misalignment occurs, there is no case where the position of the end portion of the support portion on the first optical film side is positioned on the first optical film side from the start position of the movable unit. That is, even when the positional shift amount between the substrates is $2\alpha$, there is no change in the effective area of the movable unit, such that there is no influence on the controllability of the gap between the optical films.

(9) In another aspect of the method according to the invention, the first bonding film which is formed in the forming of the first bonding film may contain an Si skeleton having siloxane bonds and elimination groups bonded to the Si skeleton, the second bonding film which is formed in the forming of the second bonding film may contain an Si skeleton having siloxane bonds and elimination groups bonded to the Si skeleton, the activating of the first bonding film may include eliminating the elimination groups from the Si skeleton of the first bonding film to form dangling bonds through a first irradiation process for irradiating ozone or ultraviolet rays, the activating of the second bonding film may include eliminating the elimination groups from the Si skeleton of the second bonding film to form dangling bonds through a second irradiation process for irradiating ozone or ultraviolet rays, and the fixing of the first substrate and the second substrate may include bonding the dangling bonds of the first bonding film and the dangling bonds of the second bonding film to each other to bond the first bonding film and the second bonding film to each other.

With this configuration, the bonding films having siloxane bonds are used. For example, a polymer substance or the like including siloxane bonds, such as polyorganosiloxane, can be used for the first bonding film and the second bonding film. A bonding film itself made of polyorganosiloxane or the like has excellent mechanical characteristics. The bonding film has particularly excellent adhesiveness to various materials. Thus, the first bonding film and the second bonding film made of polyorganosiloxane or the like have particularly strong adhesive force, and as a result, the first substrate and the second substrate can be solidly bonded to each other.

Although the bonding film made of polyorganosiloxane or the like usually exhibits repellency (non-adhesiveness), with the application of activation energy, organic groups can be easily eliminated, hydrophilicity is exhibited, and adhesiveness is developed. It is possible to perform control between non-adhesiveness and adhesiveness easily and reliably.

(10) In another aspect of the method according to the invention, in the forming of the first bonding film, the first bonding film may be formed to cover a first edge portion and a first lateral surface of the protrusion forming the support portion on the first optical film side, and a second edge portion and a second lateral surface on an opposite side to the first optical film.

With this configuration, the first bonding film is formed on the edge portions (corner portions) and the lateral surfaces of the support portion (protrusion) as well as the entire region (entire surface) of the support surface. The first bonding film is extended outward (the opposite side to the first optical film) or inward (the first optical film side) of the support portion by the amount corresponding to the film thickness. Thus, even when a slope or roundness of the first bonding film occurs in the edge portion, the slope or roundness occurs in the extended portion, such that there is no influence on the evenness in the surface of the first bonding film on the support surface. That is, bonding is realized by bringing the flat surfaces of the bonding films into contact with each other even near the edge portions of the support portion. Therefore, it is possible to reduce a possibility that the second substrate is inclined.

(11) In another aspect of the method according to the invention, in the forming of the second bonding film, the second bonding film may be formed on the entire region of a surface of the second substrate on the first substrate side.

With this configuration, the second bonding film is formed on the entire region (entire surface) of the surface of the second substrate on the first substrate side. The second bonding film is formed on the entire surface of the second substrate, such that the structure has resistance to a positional shift. According to this structure, for example, when bonding the first substrate and the second substrate to each other, even when the position of one substrate is shifted with respect to another substrate, the second bonding film is certainly present on the first bonding film, and the positional shift is not problematic. In a process for manufacturing the second substrate, it is not necessary to pattern the second bonding film, thereby suppressing the number of processes and reducing a load when manufacturing.

(12) In another aspect of the method according to the invention, in the forming of the first bonding film, the first bonding film may be formed on the entire region of a surface of the first substrate on the second substrate side.

With this configuration, the first bonding film is formed on the entire surface of the first substrate on the second substrate side. Thus, the first bonding film can be formed on the support surface (upper surface) of the protrusion forming the support and the first edge portion, the second edge portion, the first lateral surface, and the second lateral surface in the protrusion. It is not necessary to pattern the first bonding film, thereby reducing a load in the process for manufacturing the first substrate.

(13) In another aspect of the method according to the invention, in the forming of the first bonding film, the first bonding film may be formed in a region not overlapping the first optical film in plan view when viewed from the thickness direction of the first substrate, and in the forming of the second bonding film, the second bonding film may be formed in a region not overlapping the second optical film in plan view when viewed from the thickness direction of the second substrate.

With this configuration, no first bonding film is provided below the first optical film, and no second bonding film is formed below the second optical film. That is, each bonding film is formed in a region not overlapping each optical film in plan view when viewed from the thickness direction of the first substrate. According to this configuration, the bonding film has no influence on the evenness of the first optical film and the second optical film, and has no influence on the reflective characteristics of the mirror.

(14) In another aspect of the method according to the invention, in the forming of the first bonding film, the first bonding film may be formed to cover the first optical film, and in the forming of the second bonding film, the second bonding film may be formed to cover the second optical film.

With this configuration, the first bonding film is formed to cover the first optical film, and the second bonding film is formed to cover the second optical film. Thus, each bonding film on each optical film can function as a protective film (barrier film) which protects each optical film. For example, in order to bond the first bonding film and the second bonding film to each other, when an activation process is performed by irradiation of ozone or ultraviolet rays, each bonding film protects each optical film from irradiation of ozone or ultraviolet rays. Therefore, deterioration in the characteristics of the optical films is suppressed.

(15) One aspect of the invention is directed to an optical instrument including an optical filter which is manufactured by the above-described method of manufacturing an optical filter.

As described above, in the optical filter according to each aspect of the invention, even when the gap between the optical films is extremely minute, it is possible to suppress the inclination of the substrates and to control the parallelism and gap between the optical films provided on the substrates with high precision. Therefore, it is possible to obtain a small and high-performance optical filter. The optical instrument in which the optical filter is mounted can have the same effects.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail. The embodiments described below are not intended to unduly limit the content of the invention described in the appended claims, and it is not necessary that all the configuration described in the embodiments are essential as the means for resolution of the invention.

First Embodiment

Figure 14:
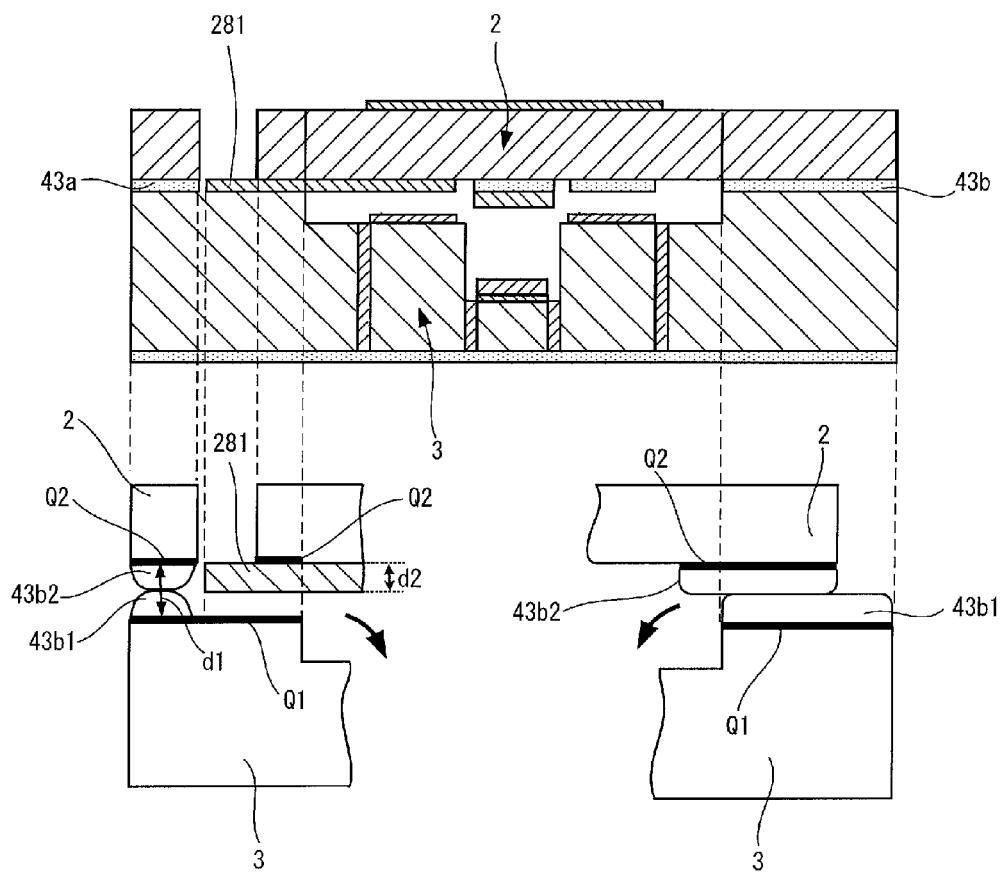
FIG. 14 is a diagram showing the structure of an Etalon filter of the related art shown in FIG. 2 of JP-A-2009-134028.

In this embodiment, description will be provided as to stable support of a second substrate in an Etalon filter in which a first substrate and a second substrate are attached to each other. In the following description, the configuration of the related art shown in FIG. 14 is referenced and compared with this embodiment. The related art shown in FIG. 14 is the related art which is described in FIG. 2 of JP-A-2009-134028.

Figure 1A:
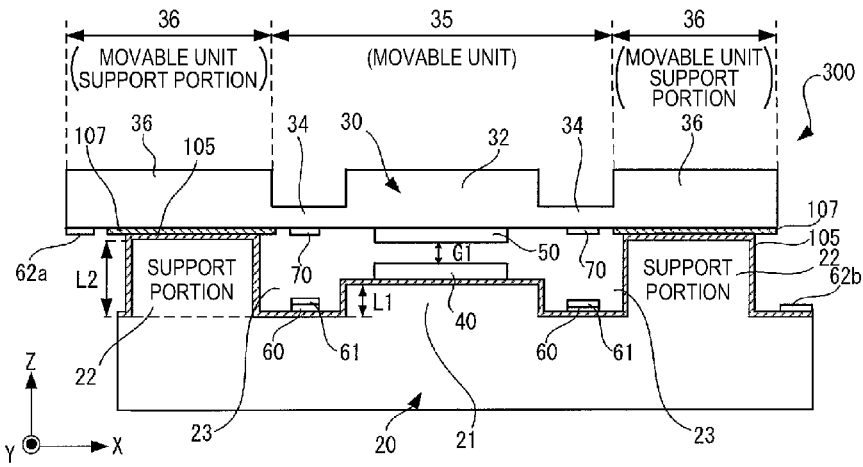
FIGS. 1A to 1G are diagrams illustrating stable support of a second substrate in an Etalon filter in which a first substrate and a second substrate are attached to each other.

FIGS. 1A to 1G are diagrams illustrating stable support of a second substrate in an Etalon filter in which a first substrate and a second substrate are attached to each other. In the following description, an Etalon filter may be simply referred to as an Etalon. FIG. 1A shows the sectional structure of a variable gap Etalon filter of this embodiment which can variably control a gap between optical films. However, this example is just an example, and an Etalon filter in which the gap is fixed may be used. In the following description, a variable gap Etalon filter may be simply referred to as a variable gap Etalon.

As shown in FIG. 1A, an Etalon filter 300 has a first substrate 20 and a second substrate 30 which are held in parallel with each other, a first optical film 40 which is provided on the first substrate 20, and a second optical film 50 which is provided on the second substrate 30. The first substrate 20 and the second substrate 30 are, for example, glass substrates which have transmissiveness with respect to light of a desired wavelength band.

The first optical film 40 and the second optical film 50 are formed to face each other at a predetermined gap G1. The first optical film 40 and the second optical film 50 have reflective characteristics and transmissive characteristics with respect to light in a desired wavelength band, and form a mirror in the Etalon filter 300.

A variable gap Etalon filter shown in FIG. 1A has a structure in which the first substrate 20 having a support portion 22 and the second substrate 30 supported by the support portion 22 are attached to each other. In order to fix the first substrate 20 and the second substrate 30 to each other, a first bonding film 105 and a second bonding film 107 are used. For the first bonding film 105 and the second bonding film 107, for example, a film which contains an Si skeleton having siloxane bonds and elimination groups bonded to the Si skeleton can be used. With the use of siloxane bonds, the first substrate 20 and the second substrate 30 can be solidly attached to each other.

In the example of FIG. 1A, the first bonding film 105 is provided on the entire region (entire surface) of a surface (that is, one principal surface) of the first substrate 20 on the second substrate 30 side. The second bonding film 107 is partially formed on the surface (that is, one principal surface) of the second substrate 30 on the first substrate 20 side.

The first substrate 20 has the support portion 22, the first optical film (first reflecting film) 40 which is provided at the center of one principal surface of the first substrate 20, a first electrode 60 which is provided around the first optical film 40, and a protective film 61 which is provided on the first electrode 60. The support portion 22 may be formed by processing the first substrate 20 itself. The first substrate 20 also has a concave portion 23.

The second substrate 30 has the second optical film (second reflecting film) 50 which is provided at the center of one principal surface of the second substrate 30, and the second electrode 70 which is provided around the second optical film 50. The first electrode 60 and the second electrode 70 form an actuator which causes the second substrate 30 serving as a movable substrate to be bent to variably control the gap between the first optical film 40 and the second optical film 50.

In this embodiment, the second substrate 30 has a movable unit 35 which includes a thin portion (diaphragm unit) 34, and a movable unit support portion 36 which supports the movable unit 35 and has a thickness greater than the thin portion 34. The support portion 22 supports the movable unit support portion 36 in the second substrate 30. The upper surface of the support portion 22 becomes a support surface.

In the example shown in FIG. 1A, the support portion 22 has a protrusion which protrudes in the thickness direction of the first substrate 20 at a distance L2 based on the bottom surface of the concave portion 23 provided in the first substrate 20. At the center of the first substrate 20, a convex portion 21 is provided to protrude at a distance L1 based on the bottom surface of the concave portion 23, and the first optical film 40 is formed on the convex portion 21. The distance L1 is set to be smaller than the distance L2.

In the example of FIG. 1A, the upper surface, the edge portions, and the lateral surfaces of the support portion (protrusion) 22 in the first substrate 20 are all covered with the first bonding film 105. When the upper surface of the support portion 22 is a support surface, the first bonding film 105 is provided on the entire region (entire surface) of the support surface of the support portion 22. The surface (the surface on the second substrate 30 side) of the first bonding film 105 on the support surface of the support portion 22 is a flat surface with no step, that is, an even surface.

The surface (that is, the rear surface) of the movable unit support portion 36 in the second substrate 30 on the first substrate 20 side becomes a supported surface. The supported surface can also include, for example, a positional shift margin region (described below) which is provided near a region which is actually supported by the support portion 22. The supported surface has a flat surface comparable to the support surface of the support portion 22. The supported surface of the second substrate 30 may be regarded as, for example, "in regard to design, a flat surface which includes a surface planned to be supported by the support portion 22 and actually supported by the support portion 22".

In the example shown in FIG. 1A, the second bonding film 107 is provided on at least a region (opposing surface) facing the entire region (entire surface) of the support surface from the supported surface of the second substrate 30. Thus, it is possible to stably support the second substrate 30 on the first substrate 20, and to suppress the inclination of the second substrate 30. This point will be described with reference to FIGS. 1B to 1D.

Figure 1B:
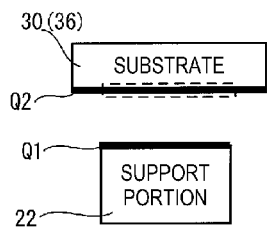
Figure 1C:
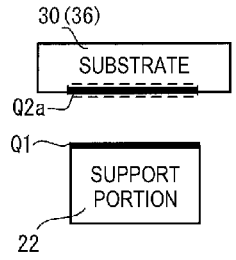
Figure 1D:
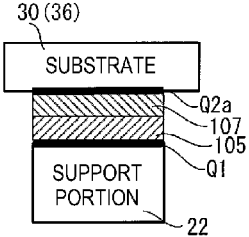

As shown in FIG. 1B, the entire region (entire surface) of the upper surface of the support portion 22 is referred to as a support surface Q1. The rear surface of the movable unit support portion 36 in the second substrate 30 is referred to as a supported surface Q2. As shown in FIG. 1C, a region facing the entire region (entire surface) of the support surface Q1 from the supported surface Q2 is referred to as Q2a. That is, the opposing region (opposing surface) facing the entire region (entire surface) of the support surface Q1 is referred to as Q2a. As shown in FIG. 1D, the first bonding film 105 is formed on the entire region (entire surface) of the support surface Q1, and the second bonding film 107 is provided on at least the opposing region (opposing surface) Q2a from the supported surface Q2.

In the example shown in FIG. 1D, the first bonding film 105 and the second bonding film 107 are bonded to each other in a state where the flat surface of the first bonding film 105 provided on the entire support surface Q1 and the flat surface of the second bonding film 107 facing the flat surface of the first bonding film 105 come into contact with each other. Thus, the fixing of the first substrate 20 and the second substrate 30, that is, the attachment of the first substrate 20 and the second substrate 30 is realized. In the support structure shown in FIG. 1D, the second substrate 30 (specifically, the movable unit support portion 36) is supported using the entire support surface Q1, and the second substrate 30 is stably supported on the support surface by bringing the flat surfaces of the bonding films 105 and 107 into contact with each other. Therefore, the inclination of the second substrate 30 with respect to the first substrate 20 is suppressed.

The gap G1 between the first optical film 40 provided on the principal surface of the first substrate 20 and the second optical film 50 provided on the principal surface of the second substrate 30 is set to, for example, about 100 nm. Thus, ultrahigh-precision gap control is required. In order to realize high-precision gap control, it is important to secure the parallelism between the surfaces (opposing surfaces) of the optical films 40 and 50 facing each other with high precision. According to the example shown in FIGS. 1A and 1D, it is possible to attach the substrates 20 and 30 held horizontally to each other while maintaining that parallelism, thereby realizing the minute gap G1 between the first optical film 40 and the second optical film 50 with high precision.

As a comparative example, an example of FIG. 14 is referenced. FIG. 14 is a diagram showing the structure of an Etalon filter of the related art shown in FIG. 2 of JP-A-2009-134028. An upper view of FIG. 14 shows the structure of an Etalon filter of the related art shown in FIG. 2 of JP-A-2009-134028 as it is, and a lower left view and a lower right view of FIG. 14 are newly added for comparison with the support structure of this embodiment in FIGS. 1A to 1G.

In the related art shown in FIG. 14, an upper substrate 2 and a lower substrate 3 are bonded to each other through bonding films 43a and 43b. The upper substrate 2 is provided with a lead electrode 281.

As shown in the lower left view of FIG. 14, in the related art of FIG. 14, there is no supported surface Q2 facing the entire region (entire surface) of the support surface Q1. Each of a first bonding film 43b1 and a second bonding film 43b2 is partially formed on each of the substrates 3 and 2. It will be apparent that the support structure of this embodiment shown in FIGS. 1A and 1D can support the upper substrate more stably compared to the support structure which supports the upper substrate 2 shown in FIG. 14. In the related art of FIG. 14, if there is a difference between the total thickness d1 of the bonding films 43b1 and 43b2 and the thickness d2 of the lead electrode 281, this causes the inclination of the upper substrate 2. In the example shown in the lower left view of FIG. 14, d1<d2. In the support structure of this embodiment shown in FIGS. 1A and 1D, the second substrate 30 (movable unit support portion 36) is supported using the entire support surface Q1, and the second substrate 30 is stably supported on the support surface by bringing the flat surfaces of the bonding films 105 and 107 into contact with each other. Thus, the inclination of the second substrate 30 is less likely to occur.

Returning to FIGS. 1A to 1G, description of this embodiment will be continued. As described in connection with the example of FIG. 1D, it is preferable that the second substrate 30 is supported using the entire support surface Q1 in the support portion 22, and the second substrate 30 is stably supported on the support surface Q1 by brining the flat surfaces of the bonding films 105 and 107 into contact with each other.

However, in actually manufacturing the optical filter 300, for example, there is a possibility that pattern misalignment in the first direction when forming the bonding films 105 and 107 or misalignment between the substrates 20 and 30 occurs. Even when misalignment occurs, in order to secure a stable substrate support structure shown in FIG. 1D, it is effective to attach the substrates 20 and 30 to each other after setting a positional shift margin when manufacturing the optical filter 300.

As shown on the lower left side of FIG. 1A, the longitudinal direction of the cross-section of the device of the optical filter 300 is referred to as the X-axis direction. When the X axis is within the support surface Q1, the axis perpendicular to the support surface Q1 in the same support surface Q1 is referred to as the Y axis, and the axis perpendicular to both the X axis and the Y axis, that is, the axis perpendicular to the support surface Q1 is referred to as the Z axis. Here, the above-described "first direction" is the X-axis direction. The first direction can be referred to as the direction parallel to the support surface Q1 and the supported surface Q2. The above-described positional shift margin (positional shift allowance) can be set in the first direction, that is, the X-axis direction. A positional shift margin can be set in the second direction, that is, in the Y-axis direction.

Figure 1E:
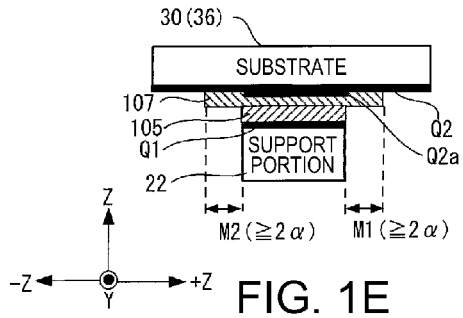

Hereinafter, the setting of a positional shift margin when manufacturing the optical filter 300 will be described with reference to FIGS. 1E to 1G. FIG. 1E shows the structure near the support portion 22 in the optical filter 300 shown in FIG. 1A. In the example shown in FIG. 1E, a first positional shift margin M1 equal to or greater than $2\alpha$ is set in the positive first direction (+X-axis direction) on the second substrate 30 (specifically, the movable unit support portion 36), and a second positional shift margin M2 equal to or greater than $2\alpha$ is set in a negative first direction (−X-axis direction). The second bonding film 107 is formed on the region Q2a facing the entire region of the support surface Q1 in the supported surface Q2 of the second substrate 30 and a positional shift margin defined by the first positional shift margin M1 and the second positional shift margin M2.

Here, $\alpha$ is the maximum misalignment amount of the second substrate 30. For example, when the maximum pattern misalignment amount in the first direction which is predicted when the second bonding film 107 is partially formed on the second substrate 30 is $\alpha 1$, and the maximum substrate misalignment amount in the first direction (X-axis direction) of the second substrate 30 with respect to the first substrate 20 which is predicted in a substrate attachment process is $\alpha 2$, the sum of $\alpha 1$ and $\alpha 2$ can be set as $\alpha$. That is, when both $\alpha 1$ and $\alpha 2$ are generated in the same direction (the positive first direction or the negative first direction), the misalignment amount in the first direction of the second substrate 30 is maximized. Thus, the maximum misalignment amount, that is, the sum of $\alpha 1$ and $\alpha 2$ can be set as $\alpha$.

In regard to the setting of the positional shift margin, it is necessary to take into consideration the maximum misalignment amount of the first substrate 20. For example, when it is assumed that the first bonding film 105 is formed on the entire region (entire region) of the support surface Q1 in the support portion 22 of the first substrate 20, in regard to the first substrate 20, it is not necessary to take into consideration pattern misalignment. For convenience of design, similarly to the second substrate 30, it is considered that the maximum misalignment amount of the first substrate 20 is $\alpha$.

When the maximum misalignment of the first substrate 20 and the maximum misalignment of the second substrate 30 occur in opposing directions, a positional shift between the bonding films 105 and 107 formed on the substrates is maximized, and the amount of the maximum positional shift between the bonding films 105 and 107 becomes $2\alpha$. There is a possibility that the maximum positional shift $2\alpha$ between the bonding films 105 and 107 is generated in any one of the positive first direction and the negative first direction.

Taking into consideration this point, in the example shown in FIGS. 1A and 1E, in regard to the supported surface Q2 of the second substrate 30, the first positional shift margin M1 equal to or greater than $2\alpha$ is set in the positive first direction, and the second positional shift margin M2 equal to or greater than $2\alpha$ is set in the negative first direction. Thus, even when the maximum positional shift is generated between the first bonding film 105 and the second bonding film 107, it is possible to secure that the second bonding film is certainly present on the first bonding film. The first bonding film 105 is formed on the support surface of the support portion 22 in the first substrate 20. Therefore, after the bonding of the bonding films 105 and 107 is completed, the first bonding film 105 is present on the support surface Q1 of the support portion 22 of the first substrate 20, and the second bonding film 107 is certainly present on the first bonding film 105.

Figure 1F:
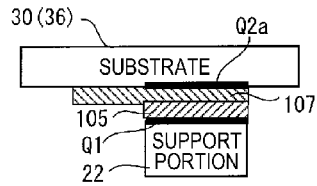

FIG. 1F is a sectional view showing near the support portion 22 when the maximum positional shift 2α is generated between the bonding films 105 and 107 in the positive first direction (+X-axis direction). Even after the positional shift is generated, it will be apparent that a preferred structure shown in FIG. 1D is realized. That is, the structure shown in FIG. 1D is realized in which "the second bonding film 107 is formed on the region Q2a facing the entire region of the support surface Q1 from the supported surface Q2 of the second substrate 30, and the substrates 20 and 30 are attached to each other by bringing the flat surfaces of the first bonding film 105 and the second bonding film 107 into contact with each other".

Here, the lower right view of FIG. 14 is referenced. In the related art structure of FIG. 14, if misalignment occurs, as shown in the lower right view of FIG. 14, the supported surface Q2 does not face the entire support surface Q1. In the structure of FIG. 1E, this phenomenon does not occur. Returning to FIGS. 1A to 1G, description will be continued.

As described above, with the use of a method of designing the optical filter 300 taking into consideration the positional shift margin shown in FIG. 1E, even when the maximum misalignment occurs, as shown in FIG. 1F, it is possible to stably support the second substrate 30 on the support portion 22 without being inclined.

Figure 1G:
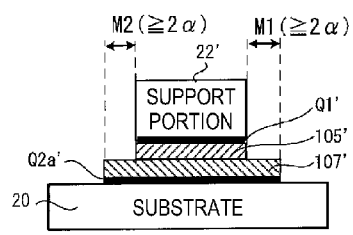

FIG. 1G shows a support structure near a support portion 22' when the support portion 22' is provided on the second substrate 30 side. In the example of FIG. 1G, the structure is equivalent to the reversed structure of the structure in the example of FIG. 1E. In the example of FIG. 1G, in order to distinguish from the example of FIG. 1E, for convenience, dashes are attached to the reference numerals of the constituent elements. In the example of FIG. 1G, it will be apparent that the same effects as in the example of FIG. 1E are obtained.

Figure 2:
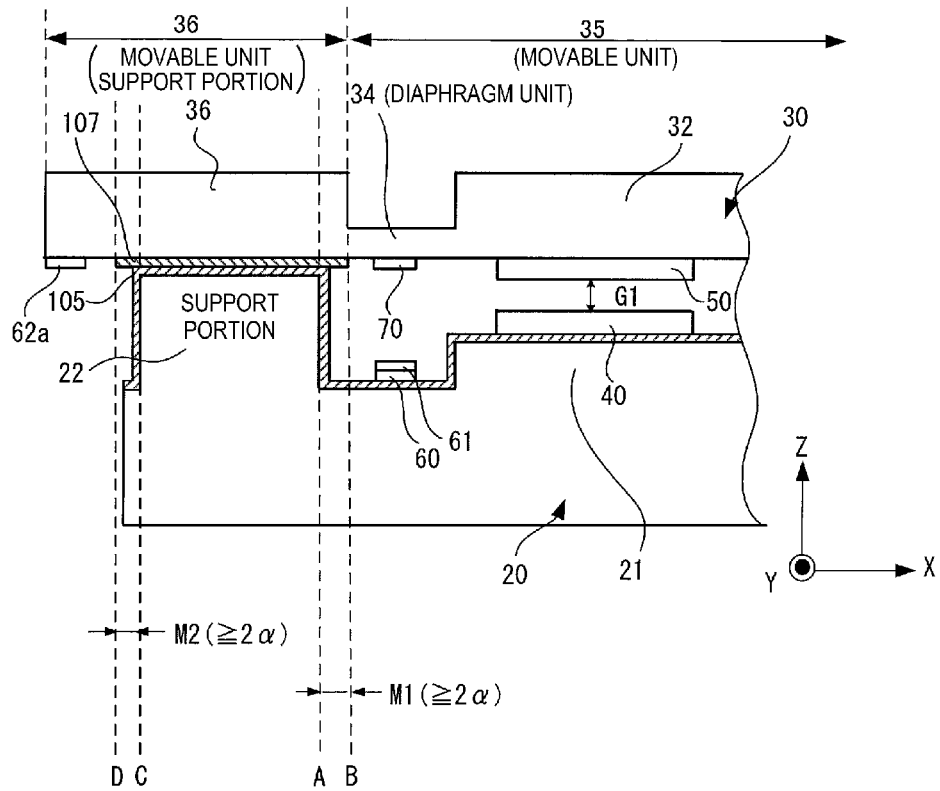
FIG. 2 is a diagram illustrating a preferred setting example of the position of a movable unit of a second substrate in a variable gap Etalon filter.

FIG. 2 is a diagram illustrating a preferred setting example of the position of a movable unit of a second substrate in a variable gap Etalon filter.

In FIG. 2, the position of the end portion (or the lateral surface) of the support portion 22 in the first substrate 20 on the first optical film 40 side is referred to as a position A, the start position of the movable unit 35 (or the thin portion 34) is referred to as a position B, the position of the end portion (or the lateral surface) of the support portion 22 on the first optical film 40 side is referred to as a position C, and the position of the end portion of the partially formed second bonding film 107 on the opposite side to the first optical film 40 is referred to as a position D. The position B may be the position of the end portion of the partially formed second bonding film 107 on the first optical film 40.

In the example shown in FIG. 2, the shortest distance in the first direction from the position A of the end portion of the support portion 22 in the first substrate 20 on the first optical film 40 side to the start position B of the movable unit 35 in the second substrate 30 is set to be equal to or greater than 2α. As described above, α is the maximum misalignment amount of each substrate in the first direction.

Bend (for example, see FIG. 11C) in the movable unit 35 is generated from the start position of the thin portion (diaphragm unit) 34, that is, the start position B of the movable unit. If the maximum misalignment is generated, and the position A of the end portion of the support portion 22 on the first optical film 40 side is inward of the start position B of the movable unit 35 of the second substrate 30, that is, on the first optical film 40 side, a part of the thin portion (diaphragm unit) 34 cannot be bent. As a result, the effective area of the movable unit 35 is reduced less than the design value in plan view when viewed from the thickness direction of the second substrate 30, making it difficult to perform gap control between the optical films with desired precision.

In contrast, in the example shown in FIG. 2, the shortest distance in the first direction from the position A to the position B is set to be equal to or greater than 2α. Thus, even when the maximum misalignment occurs, there is no case where the position A is positioned on the first optical film 40 side compared to the position B. That is, even when the positional shift amount between the substrates is 2α, there is no change in the effective area of the movable unit 35 in plan view, such that there is no influence on the controllability of the gap between the optical films 40 and 50.

Figure 3:
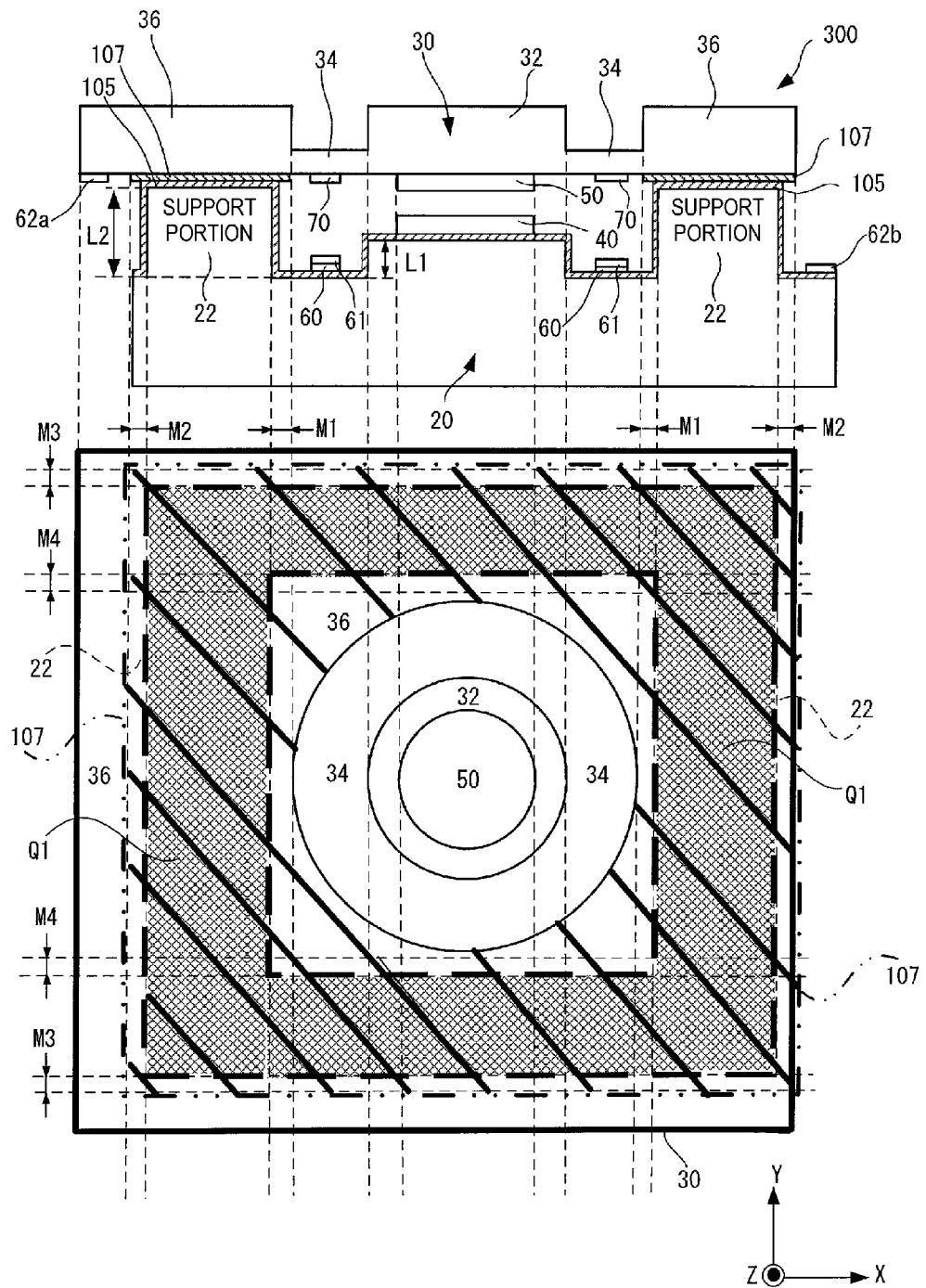
FIG. 3 is a diagram showing a support structure in plan view when viewed from the thickness direction of a second substrate.

FIG. 3 is a diagram showing a support structure in plan view when viewed from the thickness direction of the second substrate. A sectional view of a variable gap Etalon is shown on the upper side of FIG. 3, and a support structure in plan view when viewed from the thickness direction of the second substrate corresponding to the sectional view, that is, a support structure in the XY plane is shown on the lower side of FIG. 3.

In the lower view of FIG. 3, the support portion 22 is indicated by a bold broken line. A region (hatched region) surrounded by the bold broken line is the upper surface of the support portion 22, that is, the support surface Q1. In the example shown in FIG. 3, the first positional shift margin M1 and the second positional shift margin M2 are set in the first direction (X-axis direction), and a third positional shift margin M3 and a fourth positional shift margin M4 are also set in the second direction (Y-axis direction) perpendicular to the first direction (X-axis direction) within the XY plane.

The second bonding film 107 is formed on a region facing the entire region (hatched region) of the support surface Q1 from the supported surface of the second substrate 30, a positional shift margin region defined by the first positional shift margin M1 and the second positional shift margin M2, and a positional shift margin region defined by the third positional shift margin M3 and the fourth positional shift margin M4. That is, in the lower view of FIG. 3, the second bonding film 107 is formed in a bold shaded region, that is, a region surrounded by a two-dot-chain line.

In the example shown in FIG. 3, design is made taking into consideration the positional shift in the second direction (Y-axis direction) as well as the positional shift in the first direction (X-axis direction). Thus, a support structure which has resistance to an alignment positional shift is realized.

Figure 4A:
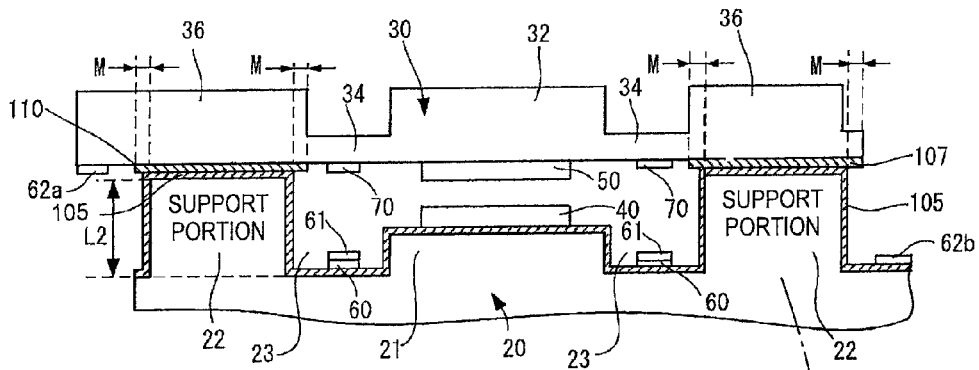
FIGS. 4A to 4C are diagrams showing an example where a first bonding film is provided on the edge portion or lateral surface of a support portion taking into consideration a slope or roundness in the edge portion.
Figure 4B:
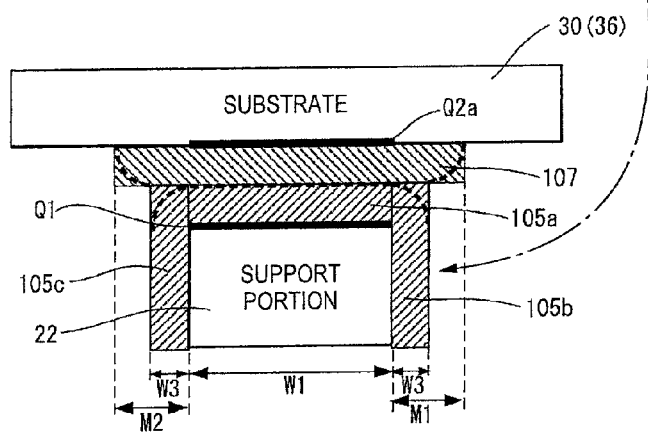
Figure 4C:
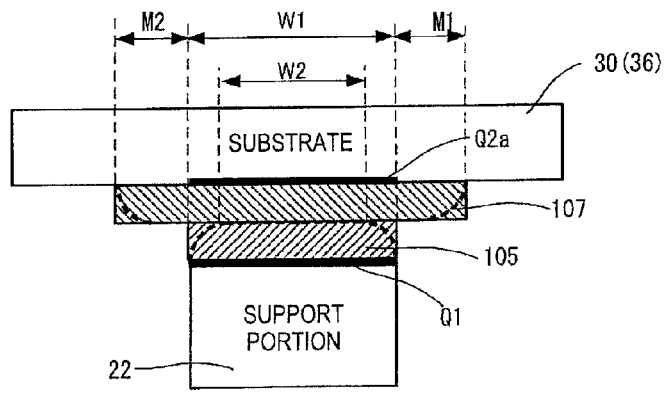

Next, a preferred pattern example of the first bonding film 105 will be described. FIGS. 4A to 4C are diagrams showing an example where a first bonding film is provided in an edge portion or a lateral surface of a support portion taking into consideration a slope or roundness in an edge portion. FIG. 4A is a sectional view of an Etalon, and FIG. 4B shows a preferred pattern example of the first bonding film. FIG. 4C shows a condition that, when the pattern of FIG. 4B is not used, a slope or roundness of the first bonding film occurs in the edge portion (corner portion) of the support portion.

First, FIG. 4C is referenced. As described above, the first bonding film 105 which is provided on the entire region (entire surface) of the support surface Q1 in the support portion 22 has a flat surface. From a microscopic view, however, a slope or roundness may occur in the first bonding film 105 near the edge (corner) of the support portion 22. In FIG. 4C, the first bonding film 105 in which a slope or roundness occurs is indicated by a broken line.

In this state, it is assumed that the second substrate 30 is placed on the support portion 22, and a weight is applied to the first bonding film 105. In this case, a slope or roundness of the first bonding film 105 occurs near the edge portion of the support portion 22, it can hardly be said that there is no case where the second substrate 30 is pulled outward (the opposite side to the first optical film 40) or inward (the first optical film 40 side) of the support portion 22, such that a minute slope occurs in the second substrate 30. That is, in the comparative example of FIG. 4C, although the width of the flat surface is designed to W1, the actual width can be regarded as being reduced to W2.

In the example shown in FIGS. 4A and 4B, a structure is used in which the edge portions (corner portions) and the lateral surfaces of the support portion 22 as well as the entire region (entire surface) of the support surface Q1 are covered with the first bonding film 105.

That is, the support portion 22 has a protrusion (convex portion) which protrudes in the thickness direction of the first substrate 20 at a predetermined distance L2 based on the bottom surface of the concave portion 23 provided in the first substrate 20. The protrusion (support portion 22) has a first edge portion and a first lateral surface on the first optical film 40 side, and a second edge portion and a second lateral surface on the opposite side to the first optical film 40. The first edge portion, the first lateral surface, the second edge portion, and the second lateral surface of the protrusion (support portion 22) are all covered with the first bonding film.

In the example of FIG. 4B, a portion of the first bonding film 105 on the support surface Q1 is represented by reference numeral 105a. A portion of the first bonding film 105 which covers the first lateral surface of the support portion 22 is represented by reference numeral 105b. A portion of the first bonding film 105 which covers the second lateral surface of the support portion 22 is represented by reference numeral 105c. The thickness of the first bonding film 105 is W3.

With this structure, the first bonding film 105 is extended outward (the opposite side to the first optical film 40) or inward (the first optical film 40 side) of the support portion 22 by the amount corresponding to the thickness W3. Thus, even when a slope or roundness occurs in the first bonding film 105 near the edge portion of the support portion 22, the slope or roundness occurs in the extended portion (the portion corresponding to the thickness W3). That is, a slope or roundness occurs in the portions 105b and 105c provided in the lateral surfaces of the first bonding film 105, such that a flat surface is maintained in the portion 105a of the first bonding film 105 on the support surface Q1. That is, a slope or roundness in the edge portion has no influence on the evenness in the surface of the first bonding film 105 on the support surface Q1.

Accordingly, the evenness of the surface of the first bonding film 105 on the entire region (entire surface) of the support surface Q1 is maintained. That is, bonding is realized by bringing the flat surfaces of the bonding films into contact with each other even near the edge portions of the support portion. Thus, according to the example shown in FIGS. 4A and 4B, it is possible to further reduce a possibility that the second substrate 30 is inclined.

Next, variations regarding the formation of the first bonding film 105 and the second bonding film 107 will be described. Each of the first bonding film 105 and the second bonding film 107 can be formed on the entire surface of the corresponding substrate. The first bonding film 105 may be partially formed, and the second bonding film 107 can be formed on the entire surface. To the contrary, the first bonding film 105 may be formed on the entire surface, and the second bonding film 107 may be partially formed. The first bonding film 105 and the second bonding film 107 may be partially formed on the substrates 20 and 30.

Figure 5A:
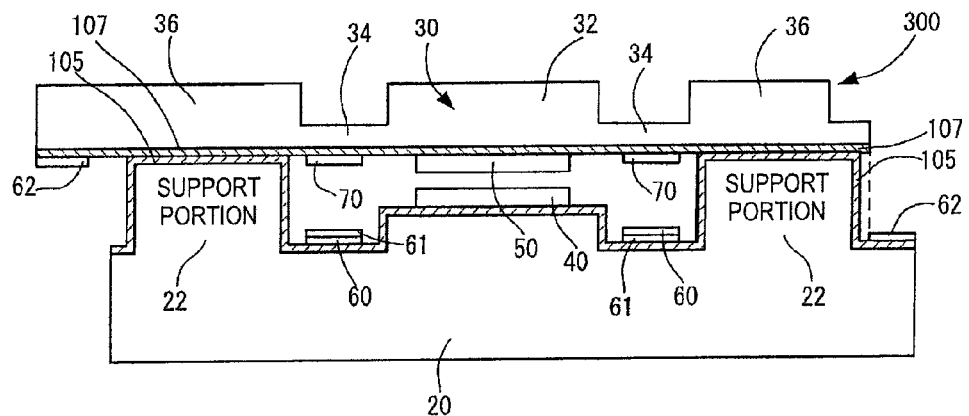
FIGS. 5A to 5C are diagrams showing a variation regarding formation of a first bonding film and a second bonding film.
Figure 5B:
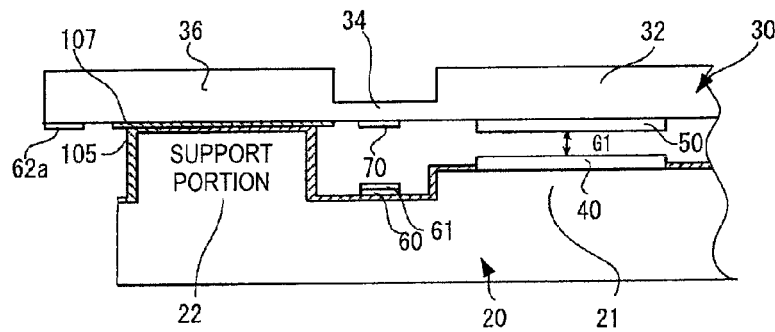
Figure 5C:
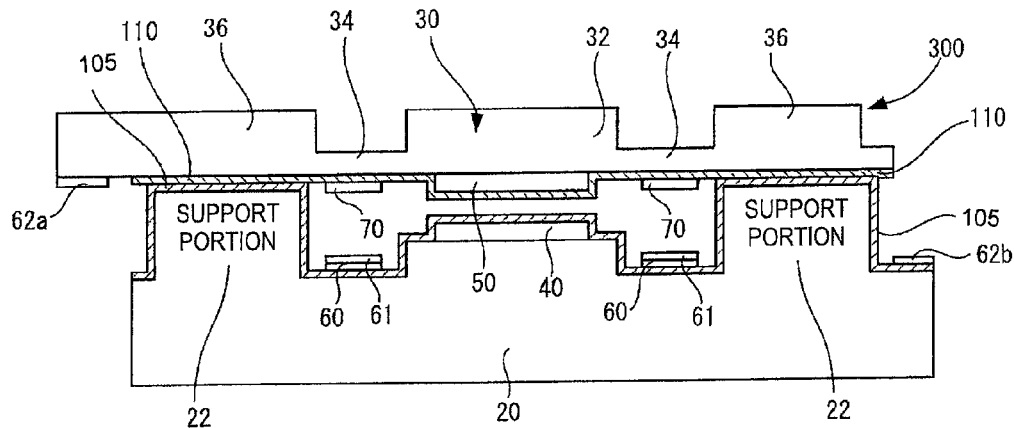

FIGS. 5A to 5C are diagrams showing variations regarding the formation of the first bonding film and the second bonding film.

In the example of FIG. 5A, the first bonding film 105 and the second bonding film 107 are respectively formed on the entire surface of the substrates 20 and 30.

That is, in the example shown in FIG. 5A, the first bonding film 105 is provided on the entire region (entire surface) of the surface of the first substrate 20 on the second substrate 30 side. Then, the first bonding film 105 can be formed on the support surface (upper surface) Q1 of the protrusion forming the support portion 22 and on the first edge portion, the second edge portion, the first lateral surface, and the second lateral surface in the protrusion. Since the first bonding film 105 need not be patterned, a load in the process for manufacturing the first substrate 20 can be relieved.

In the example shown in FIG. 5A, the second bonding film 107 is provided on the entire region (entire surface) of the surface of the second substrate 30 on the first substrate 20 side. The second bonding film 107 is formed on the entire surface of the second substrate 30, such that a positional shift margin is provided in all the directions on the XY plane, thereby realizing a structure which has resistance to a positional shift. For example, when bonding the first substrate and the second substrate to each other, even when the position of one substrate is shifted with respect to another substrate, the second bonding film 107 is certainly present on the first bonding film 105, and the positional shift is not problematic. In the process for manufacturing the second substrate 30, it is not necessary to pattern the second bonding film 107, thereby reducing a load in the process for manufacturing the second substrate 30.

In the example of FIG. 5B, no first bonding film 105 is provided below the first optical film 40. No second bonding film 107 is provided below the second optical film 50. That is, the first bonding film 105 is provided in a region not overlapping the first optical film 40 in plan view when viewed from the thickness direction of the first substrate 20, and the second bonding film 107 is provided in a region not overlapping the second optical film 50 in plan view when viewed from the thickness direction of the second substrate 30.

It may be assumed that, when the first bonding film 105 is present below the first optical film 40, the first optical film 40 is slightly inclined due to the influence of a variation in the thickness of the first bonding film 105, or the like. The first bonding film 105 below the first optical film 40 may have an influence on the reflective characteristics of the mirror. The same is applied to a case where the second bonding film 107 is present below the second optical film 50. Accordingly, in the example of FIG. 5B, no first bonding film 105 is provided below the first optical film 40, and no second bonding film 107 is provided below the second optical film 50. That is, the bonding films 105 and 107 are respectively formed in the regions not overlapping the optical films 40 and 50 in plan view when viewed from the thickness direction of the substrates 20 and 30. Therefore, there is no case where the bonding films 105 and 107 have an influence on the evenness of the optical films 40 and 50 or the reflective characteristics of the mirror.

In the example shown in FIG. 5C, the first bonding film 105 is provided on the first optical film 40, and the second bonding film 107 is provided on the second optical film 50.

That is, in the example shown in FIG. 5C, the first bonding film 105 is provided to cover the first optical film 40, and the second bonding film 107 is provided to cover the second optical film 50.

The bonding films 105 and 107 which respectively cover the optical films 40 and 50 have a function as protective films (barrier films) which protect the optical films 40 and 50. For example, when bonding the bonding films 105 and 107 to each other, an activation process may be performed by irradiation of ozone or ultraviolet rays. At this time, if the bonding films 105 and 107 are respectively present on the optical films 40 and 50, the bonding films 105 and 107 respectively protect the optical films 40 and 50 from ozone or ultraviolet rays. Therefore, deterioration in the characteristics of the optical films 40 and 50 is suppressed.

Although in this embodiment, the optical filter 300 has been described in which the dimension between the first optical film 40 and the second optical film 50 facing each other is smaller than the dimension of the first electrode 60 and the second electrode 70 facing each other, in an optical filter in which the dimension between the first optical film and the second optical film is greater than the dimension of the first electrode and the second electrode, the same effects as in this embodiment can be obtained.

Second Embodiment

Figure 6A:
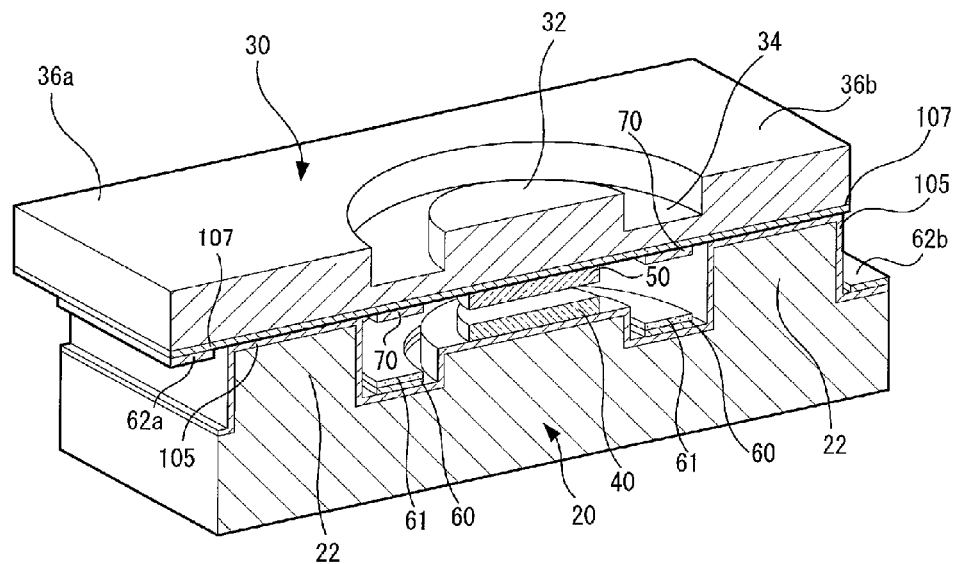
FIGS. 6A and 6B are a perspective view and a cross-sectional view of a completed variable gap Etalon filter.
Figure 6B:
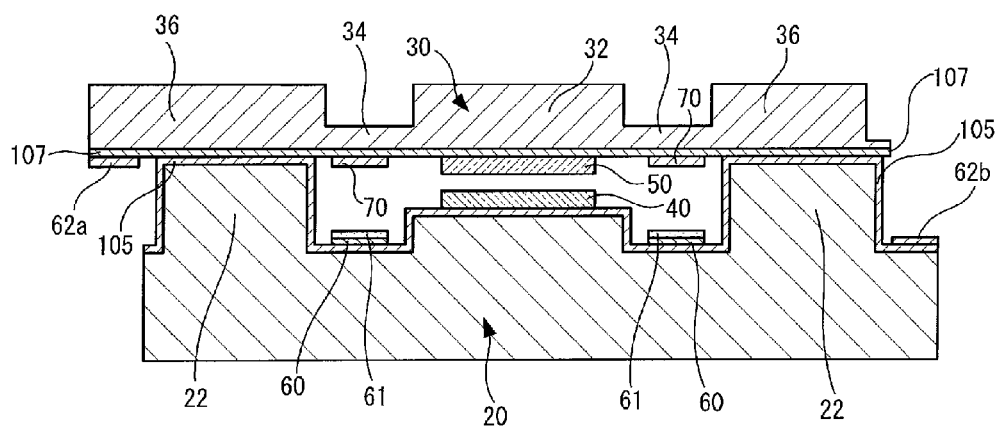

In this embodiment, a method of manufacturing a variable gap Etalon filter serving as the optical filter 300 will be described. FIGS. 6A and 6B are a perspective view and a cross-sectional view of a completed variable gap Etalon filter. The structure of the variable gap Etalon filter shown in FIGS. 6A and 6B is the same as the structure of the variable gap Etalon filter shown in FIG. 5A.

That is, in the variable gap Etalon shown in FIGS. 6A and 6B, the second bonding film 107 is provided on the entire region (entire surface) of the surface of the second substrate 30 on the first substrate 20 side. The first bonding film 105 is provided on the entire region (entire surface) of the surface of the first substrate 20 on the second substrate 30 side. In FIGS. 6A and 6B, the same parts as those in the above-described drawings are represented by the same reference numerals. Hereinafter, an example of a method of manufacturing a variable gap Etalon filter shown in FIGS. 6A and 6B will be described with reference to FIGS. 7A to 11C.

Figure 7A:
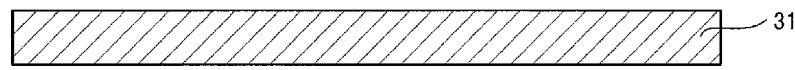
FIGS. 7A to 7H are diagrams showing an example of a process for manufacturing a second substrate before bonding.
Figure 7B:
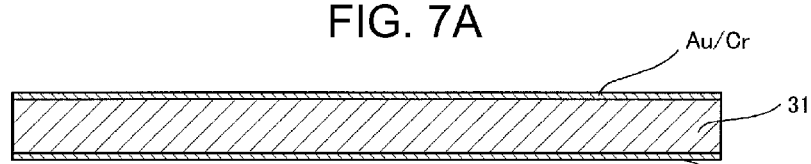
Figure 7C:
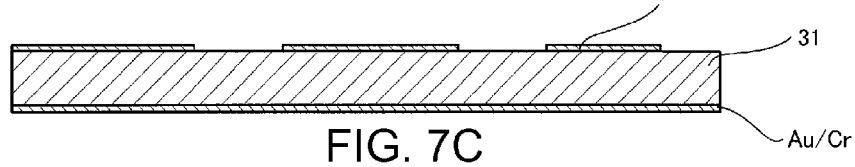

FIGS. 7A to 7H are diagrams showing an example of a process for manufacturing a second substrate before bonding. First, in the process shown in FIG. 7A, for example, both surfaces of a synthesized quartz glass substrate are mirror-polished to produce a glass substrate 31 having a thickness of, for example, 200 μm. In the process of FIG. 7B, a chromium (Cr) film having a thickness of 50 nm is formed on both surfaces of the glass substrate 31, and a gold (Au) film having a thickness of 500 nm is formed on the Cr film. In the process shown in FIG. 7C, resist (not shown) is applied onto both surfaces of the glass substrate 31 and patterned to form a resist mask. The Au/Cr films are patterned using the resist mask. That is, the Au film is etched by a compound solution of iodine and potassium iodide, and the Cr film is etched by a cerium ammonium nitrate aqueous solution.

Figure 7D:
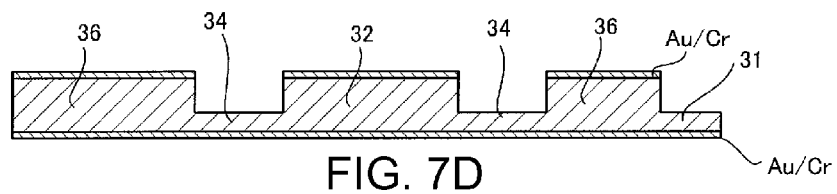
Figure 7E:
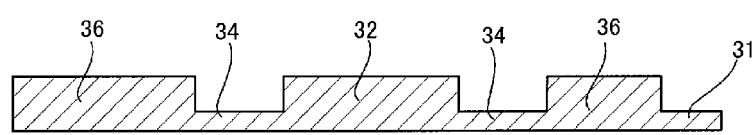

In the process shown in FIG. 7D, the glass substrate 31 is immersed in a hydrofluoric acid aqueous solution, and in the regions for forming the thin portion (diaphragm unit) 34 and an electrode extraction groove (not shown), the glass substrate 31 is etched by about 150 μm. Thus, in the regions for forming the thin portion (diaphragm unit) 34 and the electrode extraction groove (not shown), the thickness of the glass substrate 31 after etching is about 50 μm. In the process shown in FIG. 7E, the resist and the Au/Cr films attached to both surfaces of the glass substrate 31 are removed.

Figure 7F:
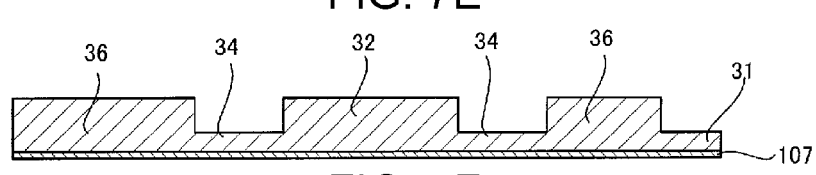

In the process shown in FIG. 7F, a plasma-polymerized film (for example, a film mainly containing polyorganosiloxane) serving as the second bonding film 107 is formed over the entire region (entire surface) of the surface of the glass substrate 31 which is bonded to the first substrate 20 by a plasma CVD method. The thickness of the second bonding film 107 is, for example, 100 nm. When the device structure shown in FIG. 1A or 5C is used, the bonding film 107 may be thereafter patterned, such that the second bonding film 107 remains only in the bonding region.

Figure 7G:
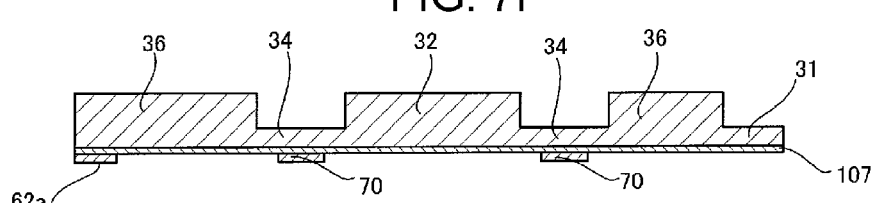

In the process of FIG. 7G, an ITO (indium tin oxide) film which is a material film for the second electrode 70 is formed on the bonding film 107 at a thickness of 0.1 μm by a sputtering method. Resist (not shown) is applied onto the ITO film and patterned, and the ITO film is etched by a compound solution of nitric acid and hydrochloric acid. As a result, the second electrode 70 is formed. Then, the resist (not shown) is removed. As the material film for the electrode, a film other than the ITO film may be used. For example, a metal film, such as gold, may be used. Since the ITO film is transparent, it is advantageous in that the presence/absence of discharging is easily confirmed.

Figure 7H:
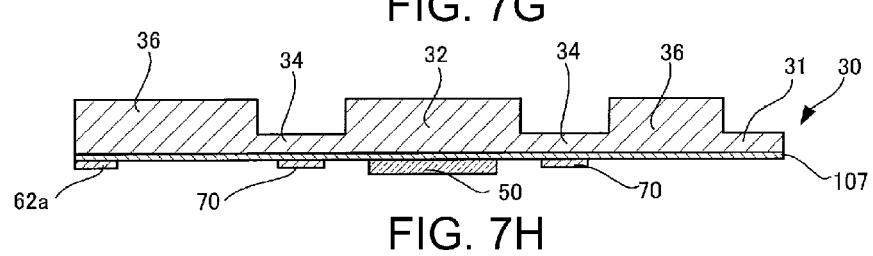

In the process of FIG. 7H, resist (not shown) is applied onto the bonding film 107, and only a region of the resist corresponding to a mirror portion (mirror forming region) is removed by photolithography. Subsequently, a mirror material (dielectric multilayer film, metal film, or the like) is formed by a sputtering method or an evaporation method. For example, a $SiO_2$ film (thickness 50 nm), a $TiO_2$ film (thickness 50 nm), and Ag (thickness 50 nm) are laminated in order from the substrate side by a sputtering method. Then, the resist (not shown) is removed, such that the mirror material is lifted off. As a result, the mirror material remains only in the mirror portion. In this way, the second optical film (second reflecting film) 50 is formed.

The thickness of the second optical film 50 is, for example, 0.1 μm. The first optical film 40 which is formed on the first substrate 20 is formed of the same material as the second optical film 50 and has the same thickness as the second optical film 50. Examples of the mirror material (the material for the optical film) include Ag, Al, $SiO_2$, $TiO_2$, $Ta_2O_5$, and the like. After the second optical film 50 is formed, a process may be provided in which a thin film of glass remaining in an electrode extraction port (not shown) is removed mechanically or chemically.

Next, an example of a process for manufacturing the first substrate 20 before bonding will be described. FIGS. 8A to 8F are diagrams showing an example of a process for manufacturing a first substrate before bonding.

Figure 8A:
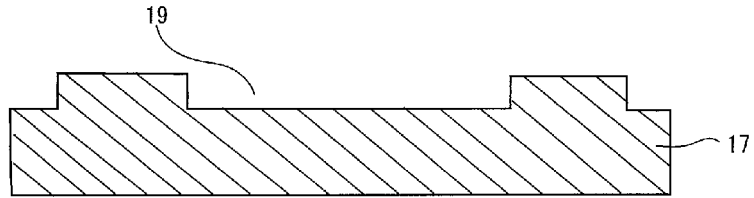
FIGS. 8A to 8F are diagrams showing an example of a process for manufacturing a first substrate before bonding.

First, in the process shown in FIG. 8A, both surfaces of a synthesized quartz glass substrate are mirror-polished to produce a glass substrate 17 having a thickness of 500 μm. Next, resist (not shown) is applied onto both surfaces of the glass substrate 17 and patterned. The glass substrate 17 is selectively etched by a hydrofluoric acid aqueous solution with the patterned resist as a mask. Thus, the concave portion 19 is formed. The depth of the concave portion is about 0.5 μm. Thereafter, the resist mask is removed.

Figure 8B:
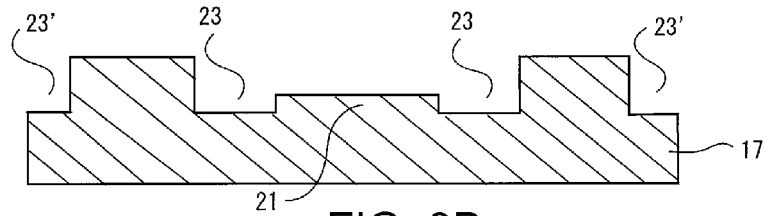

In the process of FIG. 8B, resist (not shown) is applied onto both surfaces of the glass substrate 17, and the resist which is formed on the upper surface is patterned. The glass substrate 17 is etched by, for example, 1 μm by a fluoric acid aqueous solution with the patterned resist as a mask. Thus, a concave portion 23 for mirror formation and a concave portion 23' for an electrode extraction portion are formed. Thereafter, the resist mask is removed.

Figure 8C:
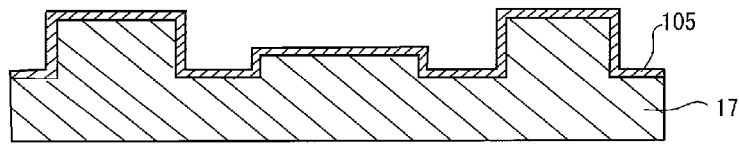

In the process of FIG. 8C, a plasma-polymerized film (for example, a film mainly containing polyorganosiloxane) serving as the first bonding film 105 is formed on the entire region (entire surface) of the surface of the glass substrate 17 which is bonded to the second substrate 30 by a plasma CVD method. The thickness of the first bonding film 105 is, for example, 100 nm.

Figure 8D:
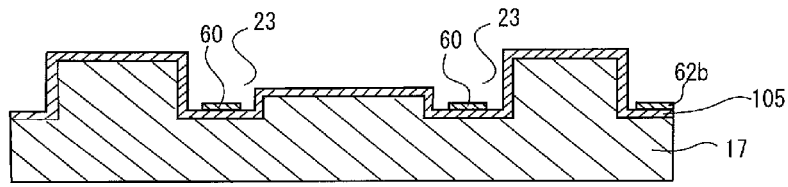
Figure 8E:
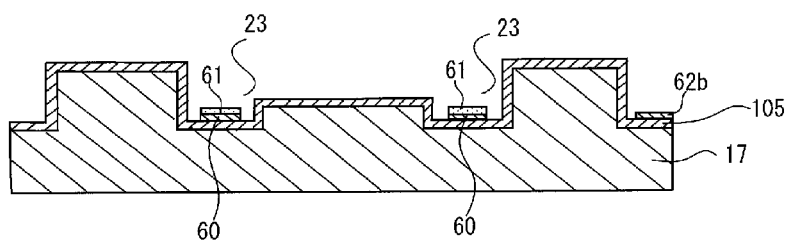

In the process of FIG. 8D, after an ITO film is formed to have a thickness of 0.1 μm by a sputtering method, the ITO film is processed in a predetermined shape by etching with a mixture of nitric acid and hydrochloric acid. Thus, a first electrode 60 is formed, and a lead electrode 62a is formed. In the process of FIG. 8E, a protective film 61 is formed to protect the first electrode 60. The protective film 61 is formed by forming, for example, a TEOS film to have a thickness of 0.1 μm by a plasma CVD method and patterning the TEOS film. The TEOS film can be patterned, for example, by a liftoff method using resist.

Figure 8F:
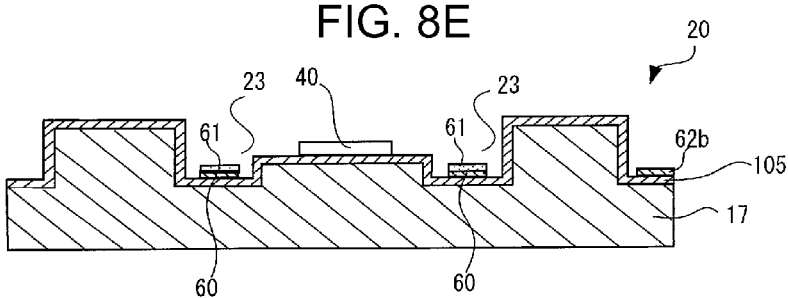

In the process of FIG. 8F, a mirror material (dielectric multilayer film, metal film, or the like) is formed on the patterned resist (not shown) by a sputtering method, an evaporation method, or the like. For example, a $SiO_2$ film (thickness 50 nm), a $TiO_2$ film (thickness 50 nm), and Ag (thickness 50 nm) are laminated in order from the substrate side by a sputtering method. Then, the resist (not shown) is removed, such that the mirror material is lifted off. As a result, the mirror material remains only in the mirror portion. In this way, the first optical film (first reflecting film) 40 is formed. The thickness of the first optical film 40 is, for example, 0.1 μm. Examples of the mirror material (the material for the optical film) include Ag, Al, $SiO_2$, $TiO_2$, $Ta_2O_5$, and the like. Thereafter, a process may be provided in which a through hole (not shown) for electrode extraction is formed by a sandblast method, a cutting method, or the like. In this way, the first substrate 20 before bonding is formed.

Figure 9A:
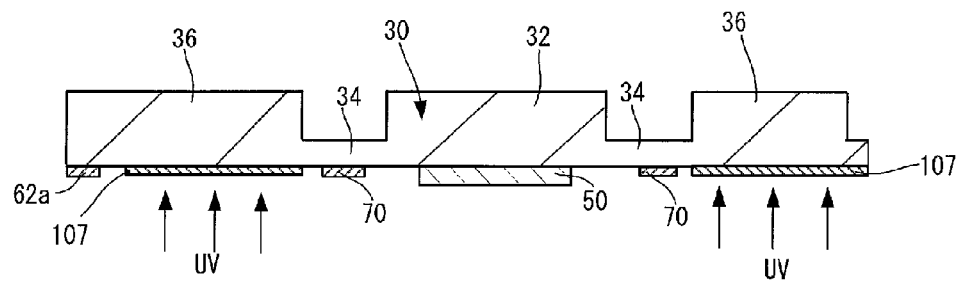
FIGS. 9A to 9C are diagrams showing an example of a process for bonding a first substrate and a second substrate.
Figure 9B:
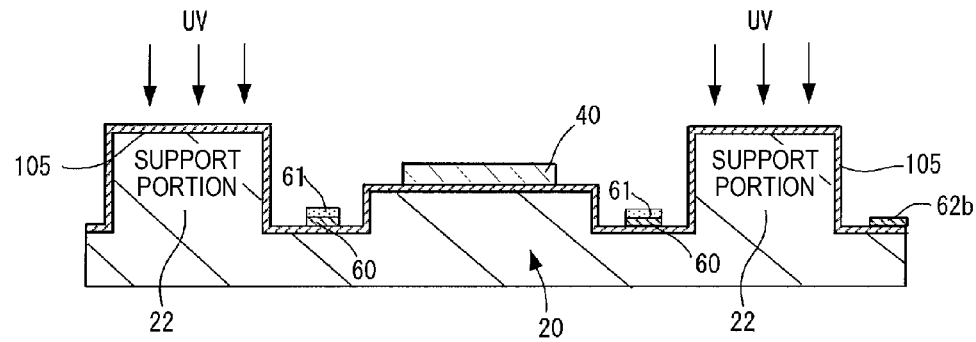
Figure 9C:
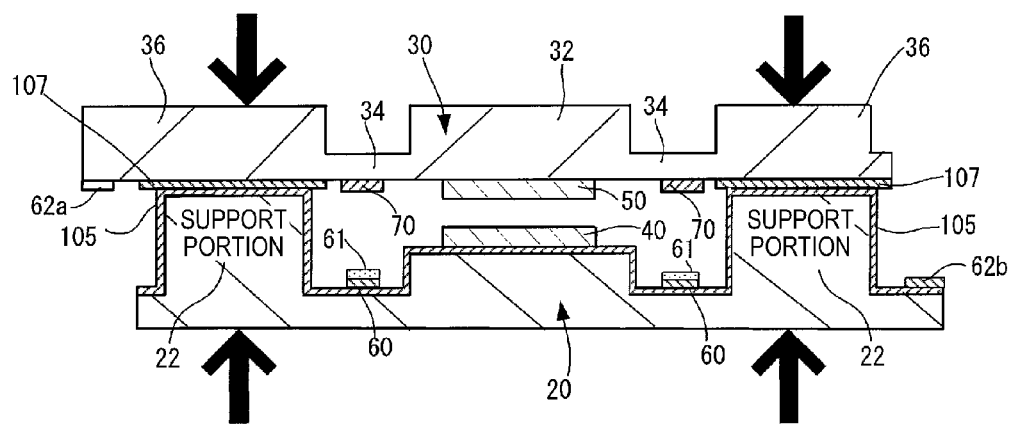

Next, a process for bonding the first substrate 20 and the second substrate 30 to each other will be described. FIGS. 9A to 9C are diagrams showing an example of a process for bonding the first substrate and the second substrate to each other. In the process of FIG. 9A, $O_2$ plasma treatment or UV treatment is performed to apply activation energy to the plasma-polymerized film (in this case, the film mainly containing polyorganosiloxane) serving as the second bonding film 107 formed on the second substrate 30. The $O_2$ plasma treatment is performed for 30 seconds under the condition that an $O_2$ flow rate is 30 cc/minute, pressure is 27 Pa, and RF power is 200 W. The UV treatment is performed, for example, for three minutes using excimer UV (wavelength 172 nm) as a UV light source.

In the process of FIG. 9B, $O_2$ plasma treatment or UV treatment is performed to apply activation energy to the plasma-polymerized film (the film mainly containing polyorganosiloxane) serving as the first bonding film 105 formed on the first substrate 20. The processing condition is the same as described above.

In the process of FIG. 9C, the first substrate 20 and the second substrate 30 with activation energy applied are arranged to face each other, the substrates are aligned (positioned), and a weight is applied in a state where the substrates 20 and 30 overlap each other. In FIG. 9C, a weight is indicated by a black arrow. At this time, the activated bonds (dangling bond) of the first bonding film 105 and the second bonding film 107 with activation energy applied are bonded to each other, such that the first bonding film 105 and the second bonding film 107 are solidly bonded to each other. In this way, the bonding (attachment or fixing) of the first substrate 20 and the second substrate 30 is completed. Thereafter, a process may be provided in which the chips are divided from each other.

As described above, in this embodiment, the first bonding film 105 and the second bonding film 107 are bonded to each other in a state where the flat surface of the first bonding film 105 which is provided on the entire region (entire surface) of the support surface Q1 comes into contact with the flat surface of the second bonding film 107. That is, the second substrate 30 is supported using the entire support surface Q1 of the support portion 22, and the second substrate 30 is stably supported on the support surface Q1 by bringing the bonding films 105 and 107 into contact with each other. In this state, the bonding films 105 and 107 are bonded to each other. Thus, the inclination of the second substrate 30 with respect to the first substrate 20 is suppressed. According to this embodiment, for example, it is possible to attach the substrates 20 and 30 held horizontally while maintaining the parallelism. Therefore, it is possible to realize a minute gap between the first optical film 40 and the second optical film 50, for example, a gap in a nanometer order with high precision.

Figure 10:
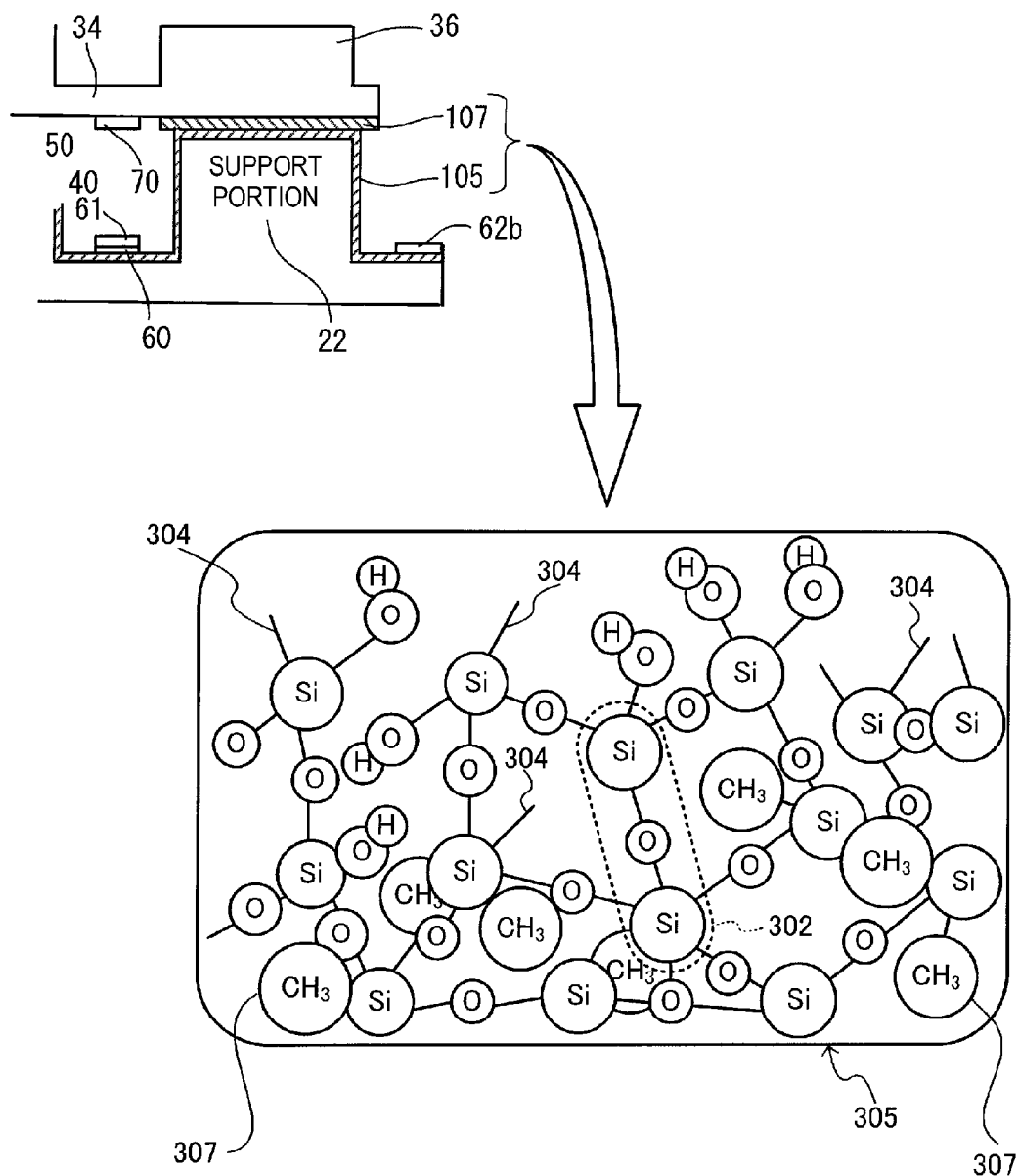
FIG. 10 is a diagram illustrating a siloxane bond.

FIG. 10 is a diagram illustrating a siloxane bond. As shown in a lower view of FIG. 10, the first bonding film 105 and the second bonding film 107 can have a Si skeleton 305 containing siloxane (Si—O—SiO) bonds 302 and elimination groups ($CH_3$ groups) 307 bonded to the Si skeleton 305. With the above-described activation process by irradiation of ozone or ultraviolet rays (UV), the elimination groups 307 can be eliminated from the Si skeleton 305 to form dangling bonds 304. The dangling bonds 304 of the first bonding film 105 and the dangling bonds 304 of the second bonding film 107 are bonded to each other, thereby bonding the first bonding film 105 and the second bonding film 107 to each other.

The bonding films 105 and 107 themselves made of polyorganosiloxane or the like have excellent mechanical characteristics (rigidity or the like). The bonding films 105 and 107 exhibit particularly excellent adhesion with respect to various materials. Thus, the first bonding film 105 and the second bonding film 107 made of polyorganosiloxane or the like have particularly strong adhesive force, and as a result, the first substrate 20 and the second substrate 30 can be solidly bonded to each other.

Although the bonding films 105 and 107 made of polyorganosiloxane or the like usually exhibit repellency (non-adhesiveness), with the application of activation energy, organic groups can be easily eliminated, hydrophilicity is exhibited, and adhesiveness is developed. It is possible to perform control between non-adhesiveness and adhesiveness easily and reliably.

Figure 11A:
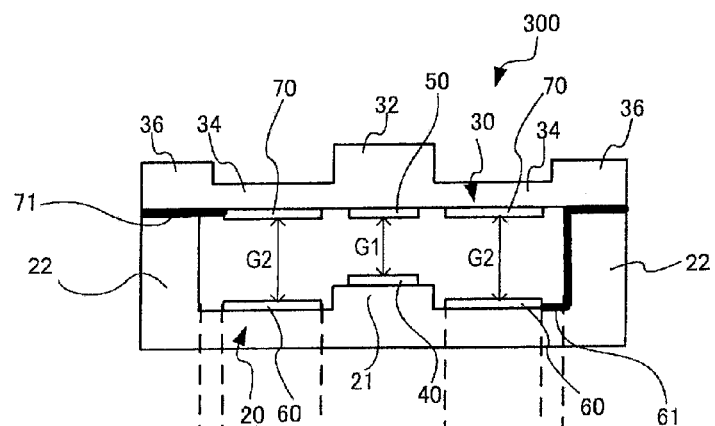
FIGS. 11A to 11C are diagrams illustrating an example of a specific structure of a variable gap Etalon filter and an operation of a variable gap Etalon filter.
Figure 11B:
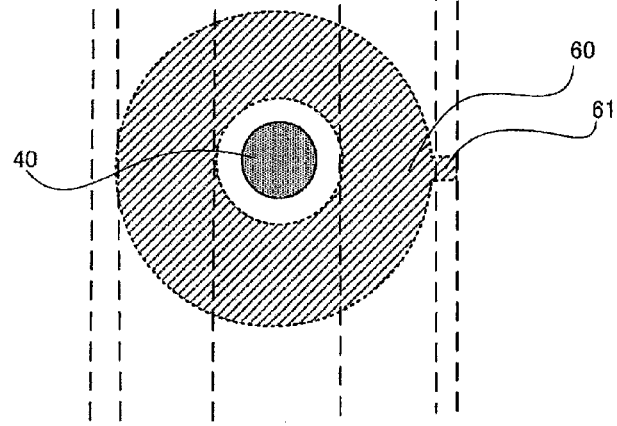
Figure 11C:
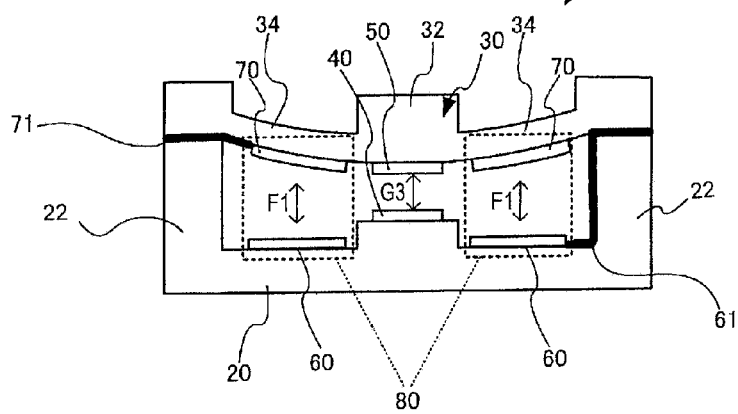

Next, a specific structure example of the optical filter 300 will be described. FIGS. 11A to 11C are diagrams illustrating an example of a specific structure of a variable gap Etalon filter and an operation of a variable gap Etalon filter. FIG. 11A is a diagram showing a sectional structure of a variable gap Etalon filter in a state where no driving voltage is applied. As shown in FIG. 11A, the initial gap between the first optical film 40 and the second optical film 50 is set to G1. As described above, the initial gap G1 is set to, for example, about 100 nm. FIG. 11B is a diagram showing a layout example of the first optical film 40 and the first electrode 60 which are formed on the first substrate 20. FIG.

11C is a diagram showing a sectional structure of a variable gap Etalon filter in a state where a driving voltage is applied. As shown in FIG. 11C, the initial gap between the first optical film 40 and the second optical film 50 is changed to G3.

In FIG. 11A, the support portion 22 is formed to movably support the second substrate 30, for example, as a single body with the first substrate 20. The support portion 22 may be provided in the second substrate 30 or may be formed separately from the first substrate 20 and the second substrate 30.

The first substrate 20 and the second substrate 30 can be formed of, for example, various kinds of glass, such as soda glass, crystalline glass, quartz glass, lead glass, potassium glass, borosilicate glass, and alkali-free glass, crystal, or the like. The two substrates 20 and 30 are bonded to each other, for example, by surface activated bonding using a plasma-polymerized film and formed as a single body. The first substrate 20 and the second substrate 30 are formed, for example, in a square shape having each side of 10 mm, and the diameter of the circular first electrode 60 shown in FIG. 11B is, for example, about 5 mm.

The first substrate 20 is formed by processing a glass base material having a thickness of, for example, 500 µm through etching. The second substrate 30 as a movable substrate has a thin portion (diaphragm unit) 34, a thick portion 32, and a movable unit support portion 36. The thin portion (diaphragm unit) 34 is provided, such that desired bend (deformation) can be generated in the second substrate 30 with a smaller driving voltage. Therefore, power saving is realized.

In the first substrate 20, for example, the circular first optical film 40 is formed in a first opposing surface at the center of an opposing surface to the second substrate 30. Similarly, the second substrate 30 is formed, for example, by processing a glass base material having a thickness of 200 µm through etching. In the second substrate 30, for example, the circular second optical film 50 is formed at the center position of an opposing surface to the first substrate 20 to face the first optical film 40.

The first optical film 40 and the second optical film 50 are formed, for example, in a circular shape having a diameter of about 3 mm. As the first optical film 40 and the second optical film 50, a metal film, such as AgC, which has a small half-value width of transmittance and excellent resolution may be used, or a dielectric multilayer film may be used. The first optical film 40 and the second optical film 50 can be formed, for example, by a method, such as sputtering. The thickness of each of optical films is, for example, about 0.03 µm. In this embodiment, for example, optical films which have a characteristic capable of dispersing the entire visible light range can be used as the first optical film 40 and the second optical film 50.

The first optical film 40 and the second optical film 50 are arranged to face each other through a first gap G1 in a voltage non-application state shown in FIG. 11A. Although in this case, the first optical film 40 is a fixed mirror and the second optical film 50 is a movable mirror, the first optical film 40 and the second optical film 50 may be reversed or may be both movable mirrors.

In plan view when viewed from the thickness direction of the first substrate 20, the first electrode 60 is formed around the first optical film 40. In the following description, the plan view refers to a case where the substrate plane is viewed from the thickness direction of each substrate. Similarly, the second electrode 70 is provided on the second substrate 30 to face the first electrode 60. The first electrode 60 and the second electrode 70 are arranged to face each other through a second gap G2. The surfaces of the first electrode 60 and the second electrode 70 are covered with insulating films.

As shown in FIG. 11B, the first electrode 60 does not overlap the first optical film 40 in plan view. Thus, it is easy to design the optical characteristic of the first optical film 40. The same is applied to the second electrode 70 and the second optical film 50.

For example, the second electrode 70 is at a common potential (for example, a ground potential) and a voltage is applied to the first electrode 60, such that, as shown in FIG. 11C, electrostatic force F1 (in this case, electrostatic attractive force) indicated by an arrow can be generated between the electrodes. That is, the first electrode 60 and the second electrode 70 form an electrostatic actuator 80. The gap between the first optical film 40 and the second optical film 50 can be variably controlled to the gap G3 smaller than the initial gap G1 by the electrostatic attractive force F1. The wavelength of transmitted light is determined depending on the size of the gap between the optical films. Therefore, a transmission wavelength can be selected by changing the gap. As indicated by bold lines in FIG. 11A, a first wire 61 is connected to the first electrode 60, and a second wire 71 is connected to the second electrode 70.

Third Embodiment

Figure 12A:
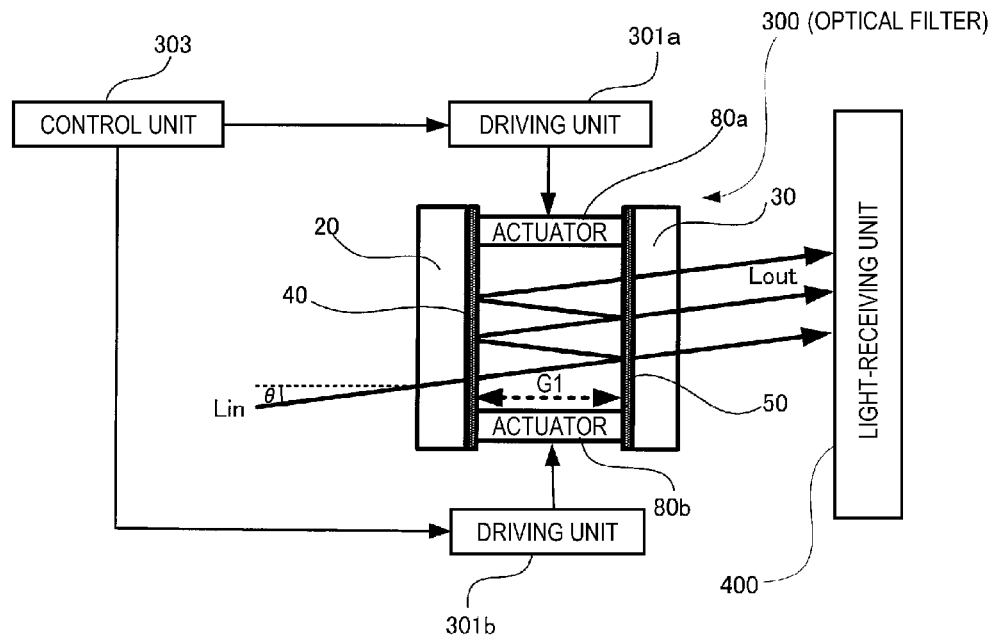
FIGS. 12A and 12B are diagrams showing an example of the structure of an optical filter using a variable gap Etalon filter.
Figure 12B:
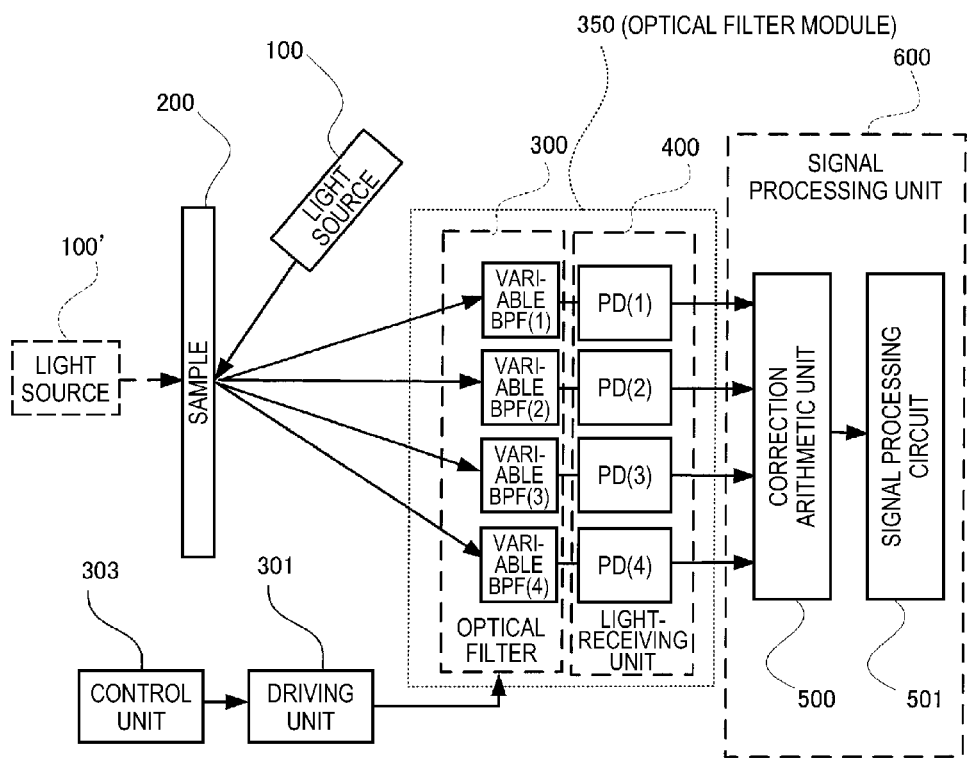

FIGS. 12A and 12B are diagrams showing an example of the structure of an optical filter using a variable gap Etalon filter and an example of a spectrometric instrument. As shown in FIG. 4A, a variable gap Etalon filter as an Etalon filter 300 has a first substrate (for example, a fixed substrate) 20 and a second substrate (for example, a movable substrate) 30 which are arranged to face each other, a first optical film 40 which is provided on the principal surface (front surface) of the first substrate 20, a second optical film 50 which is provided on the principal surface (front surface) of the second substrate 30, and actuators (for example, electrostatic actuators, piezoelectric elements, or the like) 80a and 80b which are sandwiched between the substrates and adjust the gap (distance) between the substrates.

At least one of the first substrate 20 and the second substrate 30 may be a movable substrate, or both of them may be movable substrates. The actuator 80a and the actuator 80b are respectively driven by a driving unit (driving circuit) 301a and a driving unit (driving circuit) 301b. The operations of the driving units (driving circuits) 301a and 301b are controlled by a control unit (control circuit) 303.

Light Lin which is incident at a predetermined θ from the outside is hardly dispersed and passes through the first optical film 40. Light reflection is repeated between the first optical film 40 provided on the first substrate 20 and the second optical film 50 provided on the second substrate 30. Thus, light interference occurs, and only light of a wavelength satisfying a specific condition is intensified, and a part of intensified light passes through the second optical film 50 on the second substrate 30 and reaches the light-receiving unit (a light-receiving element) 400. The wavelength of light which is intensified by interference depends on the gap G1 between the first substrate 20 and the second substrate 30. Therefore, the wavelength band of passing light can be changed by variably controlling the gap G1.

If the variable gap Etalon filter is used, a spectrometric instrument shown in FIG. 12B can be constituted. As an example of the spectrometric instrument, for example, there are a colorimeter, a spectroscopic analyzer, a spectrum analyzer, and the like. In the spectrometric instrument shown in FIG. 12B, for example, when colorimetry of a sample 200 is performed, a light source 100 is used, and when spectroscopic analysis of a sample 200 is performed, a light source 100' is used.

A spectrometric instrument includes a light source 100 (or 100'), an optical filter (spectroscopic unit) 300 which includes a plurality of wavelength-variable band-pass filters (variable BPF(1) to variable BPF(4)), a light-receiving unit 400 which includes light-receiving elements PD(1) to PD(4), a signal processing unit 600 which performs given signal processing on the basis of light-receiving signal (light quantity data) obtained from the light-receiving unit 400 to obtain a spectrophotometric distribution or the like, a driving unit 301 which drives the variable BPF(1) to the variable BPF(4), and a control unit 303 which variably controls the spectral band of each of the variable BPF(1) to the variable BPF(4). The signal processing unit 600 has a signal processing circuit 501, and if necessary, a correction arithmetic unit 500 may be provided. With the measurement of the spectrophotometric distribution, for example, it is possible to perform colorimetry of the sample 200, component analysis of the sample 200, or the like. As the light source 100 (100'), for example, a light source (solid-state light-emitting element light source) using a solid-state light-emitting element light source, such as an incandescent lamp, a fluorescent lamp, a discharge tube, or an LED, may be used.

An optical filter module 350 includes the optical filter 300 and the light-receiving unit 400. The optical filter module 350 can be applied to a spectrometric instrument and can be used as a receiving unit (including a light-receiving optical system and a light-receiving element) of an optical communication device. This example will be described below with reference to FIGS. 5A to 5C. The optical filter module 350 of this embodiment has advantages of suppressing deterioration in the characteristics of the optical film to achieve high reliability, increasing the wavelength range of transmitted light, and being small, lightweight, and convenient.

Fourth Embodiment

Figure 13:
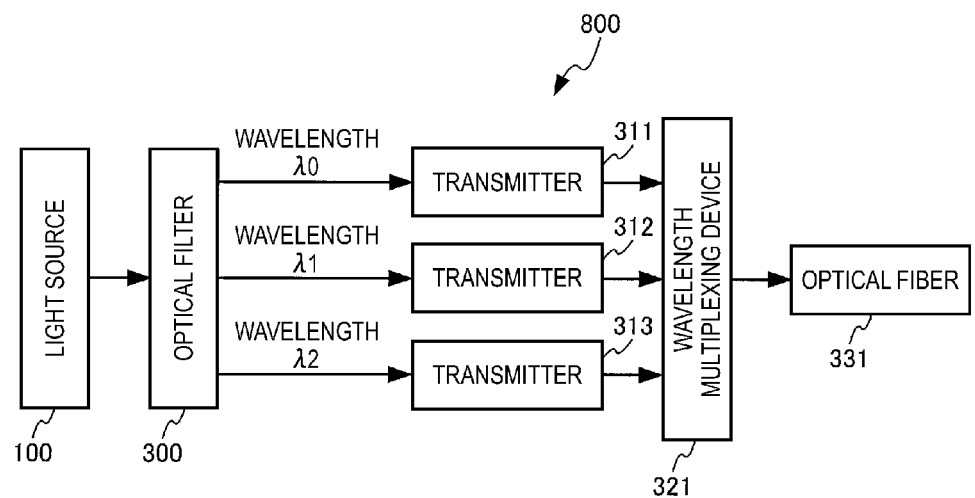
FIG. 13 is a block diagram showing the schematic configuration of a transmitter of a wavelength multiplexing communication system which is an example of an optical instrument.

FIG. 13 is a block diagram showing the schematic configuration of a transmitter of a wavelength multiplexing communication system which is an example of an optical instrument. In wavelength multiplexing (WDM: Wavelength Division Multiplexing) communication, from the characteristic that signals of different wavelengths do not interfere with each other, if a plurality of light signals of different wavelengths are multiply used in a single optical fiber, the amount of data transmission can be improved without increasing an optical fiber line.

In FIG. 13, a wavelength multiplexing transmitter 800 has an optical filter 300 on which light from a light source 100 is incident. Light of a plurality of wavelengths λ0, λ1, λ2, . . . is transmitted from the optical filter 300 (including an Etalon element having one of the above-described mirror structures). Transmitters 311, 312, and 313 are provided by wavelength. Light pulse signals for a plurality of channels from the transmitters 311, 312, and 313 are adjusted to one signal by a wavelength multiplexing device 321 and sent to a single optical fiber transmission path 331.

The invention can also be applied to an optical code division multiplexing (OCDM) transmitter. This is because, while the OCDM identifies channels by pattern matching of encoded light pulse signals, light pulses which form the light pulse signals include light components of different wavelengths. As described above, if the invention is applied to an optical instrument, a reliable optical instrument (for example, various sensors or optical communication application instrument) in which deterioration in the characteristics of the optical films is suppressed is realized.

As described above, according to at least one embodiment of the invention, for example, in an optical filter in which substrates are attached to each other, it is possible to suppress the inclination of the substrates, thereby securing the parallelism between optical films on the substrates. The invention is appropriately applied to, for example, an interference optical filter, such as an Etalon filter. The invention is not limited to this example, and the invention can be applied to all structures (elements or devices) which use an optical filter having both a light-reflective characteristic and a light-transmissive characteristic.

Although the invention has been described with reference to the embodiments, those skilled in the art should readily understand that various modifications may be made without substantially departing from the novel matter and effects of the invention. Thus, those modifications also fall within the scope of the invention. For example, a term described at least once with a different term with a broader sense or the same meaning in the specification or the accompanying drawings can be replaced with the different term in any part of the specification or the accompanying drawings.

The entire disclosure of Japanese Patent Application No. 2010-184225, filed Aug. 19, 2010 is expressly incorporated by reference herein.

What is claimed is:

1. An optical filter comprising:
   a first substrate which has a support portion, the support portion being a convex portion of the first substrate;
   a second substrate which is supported by the support portion;
   a first optical film which is provided on the first substrate;
   a second optical film which is provided on the second substrate to face the first optical film;
   a first bonding film which is provided on a support surface of the support portion supporting the second substrate; and
   a second bonding film which is provided between the second substrate and the first bonding film,
   wherein the first substrate and the second substrate are fixed to each other by bonding the first bonding film and the second bonding film,
   wherein the support portion has a first face which faces the second substrate, a second face and a third face that each intersect the first face, the third face facing the first optical film, and the first bonding film being provided on each of the first, second and third faces,
   when viewed from a side of the second substrate to a side of the first substrate, the first bonding film extends beyond an edge of the support surface, and the second bonding film extends beyond an edge of the first bonding film, and
   wherein a distance that the first bonding film extends beyond an edge of the support surface is W3, and a distance that the second bonding film extends from the edge of the support surface to the edge of the first bonding film located at an interior of the filter is M1.

2. The optical filter according to claim 1,
   wherein a concave portion is provided in the first substrate, and the support portion has a protrusion which protrudes in the thickness direction of the first substrate at a predetermined distance based on a bottom surface of the concave portion,
   the protrusion is provided around the first optical film in plan view when viewed from the thickness direction of the first substrate, and
   a first edge portion and a first lateral surface of the protrusion on the first optical film side in the support portion and a second lateral surface and a second edge portion on an opposite side to the first optical film are covered with the first bonding film.

3. The optical filter according to claim 2, wherein the second bonding film is provided on the entire surface of a surface of the second substrate on the first substrate side.

4. The optical filter according to claim 3, wherein the first bonding film is provided on the entire region of a surface of the first substrate on the second substrate side.

5. The optical filter according to claim 2, wherein the first bonding film is provided in a region not overlapping the first optical film in plan view when viewed from the thickness direction of the first substrate, and
the second bonding film is provided in a region not overlapping the second optical film in plan view when viewed from the thickness direction of the second substrate.

6. The optical filter according to claim 2, wherein the first bonding film is provided on the first optical film, and the second bonding film is provided on the second optical film.

7. The optical filter according to claim 1, wherein the first substrate has a second convex portion, the first optical film overlapping the second convex portion when viewed from a side of the second substrate to a side of the first substrate.

8. The optical filter according to claim 1, wherein the first bonding film comprises a siloxane skeleton.

9. The optical filter according to claim 1, wherein the first bonding film on the third face contacts a space.

10. The optical filter according to claim 9, wherein the space exists between the first bonding film on the third face and the first optical film.

11. The optical filter according to claim 1, wherein a distance that the second bonding film extends from an opposite edge of the support surface to an opposite edge of the first bonding film located at an exterior of the filter is M2, and M1 and M2 are each greater than W3.

12. An optical filter comprising:
a first substrate which has a support portion, the support portion being a convex portion of the first substrate;
a second substrate which is supported by the support portion;
a first bonding film which is provided on a support surface of the support portion; and
a second bonding film which is provided between the second substrate and the first bonding film,
wherein the first substrate and the second substrate are fixed to each other by bonding the first bonding film and the second bonding film,
wherein the support portion has a first face which faces the second substrate, a second face and a third face that each intersect the first face, the third face facing the first optical film, and the first bonding film being provided on each of the first, second and third faces,
when viewed from a side of the second substrate to a side of the first substrate, the first bonding film extends beyond an edge of the support surface, and the second bonding film extends beyond an edge of the first bonding film, and
wherein a distance that the first bonding film extends beyond an edge of the first face is W3, and a distance that the second bonding film extends from the edge of the first face to the edge of the first bonding film located at an interior of the filter is M1.

13. The optical filter according to claim 12, wherein the first substrate has a second convex portion, the first optical film overlapping the second convex portion when viewed from a side of the second substrate to a side of the first substrate.

14. The optical filter according to claim 12, wherein the first bonding film comprises a siloxane skeleton.

15. The optical filter according to claim 12, wherein the first bonding film on the third face contacts a space.

16. The optical filter according to claim 15, wherein the space exists between the first bonding film on the third face and the first optical film.

17. The optical filter according to claim 12, wherein a distance that the second bonding film extends from an opposite edge of the first face to an opposite edge of the first bonding film located at an exterior of the filter is M2, and M1 and M2 are each greater than W3.

18. An optical filter comprising:
a first substrate that has a support portion, the support portion being a convex portion of the first substrate;
a second substrate that is disposed so as to oppose to the first substrate;
a first optical film that is disposed between the first substrate and the second substrate;
a second optical film that is disposed between the first optical film and the second substrate;
a first bonding film that is disposed between the support portion and the second substrate; and
a second bonding film that is provided between the second substrate and the first bonding film,
wherein the support portion has a first face that is disposed so as to oppose to the second substrate, a second face intersecting with the first face, and a third face intersecting with the first face,
when viewed from a side of the second substrate to a side of the first substrate, the third face is located between the second face and the first optical film, and the second bonding film extends beyond an edge of the first bonding film,
the first bonding film is disposed on each of the first face, the second face, and the third face, and
wherein a distance that the first bonding film extends beyond an edge of the first face is W3, and a distance that the second bonding film extends from the edge of the first face to the edge of the first bonding film located at an interior of the filter is M1.

19. The optical filter according to claim 18, wherein the first substrate has a second convex portion, the first optical film overlapping the second convex portion when viewed from a side of the second substrate to a side of the first substrate.

20. The optical filter according to claim 18, wherein the first bonding film comprises a siloxane skeleton.

21. The optical filter according to claim 18, wherein the first bonding film on the third face contacts a space.

22. The optical filter according to claim 21, wherein the space exists between the first bonding film on the third face and the first optical film.

23. The optical filter according to claim 18, wherein a distance that the second bonding film extends from an opposite edge of the first face to an opposite edge of the first bonding film located at an exterior of the filter is M2, and M1 and M2 are each greater than W3.

* * * * *